United States Patent
Yip et al.

(10) Patent No.: US 10,091,120 B2
(45) Date of Patent: Oct. 2, 2018

(54) SECONDARY INPUT QUEUES FOR MAINTAINING A CONSISTENT NETWORK STATE

(71) Applicant: Nicira, Inc., Palo Alto, CA (US)

(72) Inventors: Alexander Yip, Menlo Park, CA (US); Timothy L. Hinrichs, Los Altos, CA (US); Amar Padmanabhan, Menlo Park, CA (US); Natasha Gude, San Francisco, CA (US); Igor Ganichev, Mountain View, CA (US); Anuprem Chalvadi, Sunnyvale, CA (US)

(73) Assignee: NICIRA, INC., Palo Alto, CA (US)

( * ) Notice: Subject to any disclaimer, the term of this patent is extended or adjusted under 35 U.S.C. 154(b) by 959 days.

(21) Appl. No.: 14/316,783

(22) Filed: Jun. 26, 2014

(65) Prior Publication Data
US 2015/0319096 A1    Nov. 5, 2015

Related U.S. Application Data

(60) Provisional application No. 61/988,869, filed on May 5, 2014.

(51) Int. Cl.
| | | |
|---|---|---|
| *G06F 15/173* | (2006.01) | |
| *H04L 12/875* | (2013.01) | |
| *H04L 12/26* | (2006.01) | |
| *H04L 29/08* | (2006.01) | |
| *H04L 12/801* | (2013.01) | |
| *H04L 12/24* | (2006.01) | |

(52) U.S. Cl.
CPC ............ *H04L 47/56* (2013.01); *H04L 41/042* (2013.01); *H04L 41/0873* (2013.01); *H04L 43/08* (2013.01); *H04L 43/0811* (2013.01); *H04L 47/10* (2013.01); *H04L 67/10* (2013.01)

(58) Field of Classification Search
USPC ................................ 709/220, 224, 226, 230
See application file for complete search history.

(56) References Cited

U.S. PATENT DOCUMENTS

| | | |
|---|---|---|
| 5,504,921 A | 4/1996 | Dev et al. |
| 5,550,816 A | 8/1996 | Hardwick et al. |

(Continued)

FOREIGN PATENT DOCUMENTS

| | | |
|---|---|---|
| AU | 2012328699 | 4/2014 |
| EP | 1443423 | 8/2004 |

(Continued)

OTHER PUBLICATIONS

U.S. Appl. No. 14/316,786, filed Jun. 26, 2014, Yip, Alexander, et al.

(Continued)

*Primary Examiner* — Normin Abedin
(74) *Attorney, Agent, or Firm* — Adeli LLP

(57) ABSTRACT

Some embodiments provide a novel network control system that uses secondary input queues to receive and store inputs from multiple input sources prior to moving the inputs to a primary input queue for processing. The secondary input queues provide a separate storage for each input source so that the inputs from the different sources do not get mixed with each other to ensure that fixed points and barriers sent to the controller maintain their integrity.

20 Claims, 13 Drawing Sheets

(56) References Cited

U.S. PATENT DOCUMENTS

| | | |
|---|---|---|
| 5,729,685 A | 3/1998 | Chatwani et al. |
| 5,751,967 A | 5/1998 | Raab et al. |
| 5,796,936 A | 8/1998 | Watabe et al. |
| 5,805,791 A | 9/1998 | Grossman et al. |
| 6,104,699 A | 8/2000 | Holender et al. |
| 6,219,699 B1 | 4/2001 | McCloghrie et al. |
| 6,512,745 B1 | 1/2003 | Abe et al. |
| 6,539,432 B1 | 3/2003 | Taguchi et al. |
| 6,680,934 B1 | 1/2004 | Cain |
| 6,768,740 B1 | 7/2004 | Perlman et al. |
| 6,785,843 B1 | 8/2004 | McRae et al. |
| 6,862,263 B1 | 3/2005 | Simmons |
| 6,941,487 B1 | 9/2005 | Balakrishnan et al. |
| 6,963,585 B1 | 11/2005 | Le Pennec et al. |
| 6,999,454 B1 | 2/2006 | Crump |
| 7,046,630 B2 | 5/2006 | Abe et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,286,490 B2 | 10/2007 | Saleh et al. |
| 7,359,971 B2 | 4/2008 | Jorgensen |
| 7,450,598 B2 | 11/2008 | Chen et al. |
| 7,483,370 B1 | 1/2009 | Dayal et al. |
| 7,606,260 B2 | 10/2009 | Oguchi et al. |
| 7,627,692 B2 | 12/2009 | Pessi |
| 7,649,851 B2 | 1/2010 | Takashige et al. |
| 7,710,874 B2 | 5/2010 | Balakrishnan et al. |
| 7,730,486 B2 | 6/2010 | Herington |
| 7,792,987 B1 | 9/2010 | Vohra et al. |
| 7,818,452 B2 | 10/2010 | Matthews et al. |
| 7,826,482 B1 | 11/2010 | Minei et al. |
| 7,885,276 B1 | 2/2011 | Lin |
| 7,937,438 B1 | 5/2011 | Miller et al. |
| 7,948,986 B1 | 5/2011 | Ghosh et al. |
| 8,018,866 B1 | 9/2011 | Kasturi et al. |
| 8,027,354 B1 | 9/2011 | Portolani et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,779 B2 | 11/2011 | Beardsley et al. |
| 8,166,201 B2 | 4/2012 | Richardson et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,312,129 B1 | 11/2012 | Miller et al. |
| 8,391,289 B1 | 3/2013 | Yalagandula et al. |
| 8,422,359 B2 | 4/2013 | Nakajima |
| 8,456,984 B2 | 6/2013 | Ranganathan et al. |
| 8,504,718 B2 | 8/2013 | Wang et al. |
| 8,621,058 B2 | 12/2013 | Eswaran et al. |
| 8,644,188 B1 | 2/2014 | Brandwine et al. |
| 8,660,129 B1 | 2/2014 | Brendel et al. |
| 9,319,336 B2 | 4/2016 | Thakkar et al. |
| 9,319,337 B2 | 4/2016 | Koponen et al. |
| 9,319,338 B2 | 4/2016 | Padmanabhan et al. |
| 2003/0093481 A1 | 5/2003 | Mitchell et al. |
| 2004/0044773 A1 | 3/2004 | Bayus et al. |
| 2004/0047286 A1 | 3/2004 | Larsen et al. |
| 2004/0073659 A1 | 4/2004 | Rajsic et al. |
| 2004/0098505 A1 | 5/2004 | Clemmensen |
| 2004/0267897 A1 | 12/2004 | Hill et al. |
| 2005/0018669 A1 | 1/2005 | Arndt et al. |
| 2005/0038834 A1 | 2/2005 | Souder et al. |
| 2005/0083953 A1 | 4/2005 | May |
| 2005/0120160 A1 | 6/2005 | Plouffe et al. |
| 2005/0201398 A1 | 9/2005 | Naik et al. |
| 2005/0228952 A1 | 10/2005 | Mayhew et al. |
| 2005/0228971 A1 | 10/2005 | Samra et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0184937 A1 | 8/2006 | Abels et al. |
| 2006/0193266 A1 | 8/2006 | Siddha et al. |
| 2007/0043860 A1 | 2/2007 | Pabari |
| 2007/0156919 A1 | 7/2007 | Potti et al. |
| 2007/0220358 A1 | 9/2007 | Goodill et al. |
| 2007/0260721 A1 | 11/2007 | Bose et al. |
| 2007/0297428 A1 | 12/2007 | Bose et al. |
| 2008/0002579 A1 | 1/2008 | Lindholm et al. |
| 2008/0034249 A1 | 2/2008 | Husain et al. |
| 2008/0040467 A1 | 2/2008 | Mendiratta et al. |
| 2008/0049621 A1 | 2/2008 | McGuire et al. |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0159301 A1 | 7/2008 | de Heer |
| 2008/0165704 A1 | 7/2008 | Marchetti et al. |
| 2009/0276661 A1 | 11/2009 | Deguchi et al. |
| 2009/0279549 A1 | 11/2009 | Ramanathan et al. |
| 2010/0002722 A1 | 1/2010 | Porat et al. |
| 2010/0058106 A1 | 3/2010 | Srinivasan et al. |
| 2010/0162036 A1 | 6/2010 | Linden et al. |
| 2010/0205479 A1 | 8/2010 | Akutsu et al. |
| 2011/0103259 A1 | 5/2011 | Aybay et al. |
| 2011/0134931 A1 | 6/2011 | Merwe et al. |
| 2011/0173490 A1* | 7/2011 | Narayanaswamy ......... H04L 63/1408 714/4.11 |
| 2011/0261825 A1 | 10/2011 | Ichino |
| 2011/0317559 A1 | 12/2011 | Kern et al. |
| 2012/0120964 A1 | 5/2012 | Koponen et al. |
| 2012/0151550 A1 | 6/2012 | Zhang |
| 2012/0158942 A1* | 6/2012 | Kalusivalingam ...... H04L 45/02 709/224 |
| 2012/0185553 A1 | 7/2012 | Nelson |
| 2012/0300615 A1 | 11/2012 | Kempf et al. |
| 2013/0044636 A1 | 2/2013 | Koponen et al. |
| 2013/0044641 A1 | 2/2013 | Koponen et al. |
| 2013/0044752 A1 | 2/2013 | Koponen et al. |
| 2013/0054761 A1 | 2/2013 | Kempf et al. |
| 2013/0058350 A1 | 3/2013 | Fulton |
| 2013/0103817 A1 | 4/2013 | Koponen et al. |
| 2013/0163602 A1 | 6/2013 | Kang et al. |
| 2013/0208621 A1 | 8/2013 | Manghirmalani et al. |
| 2013/0211549 A1 | 8/2013 | Thakkar et al. |
| 2013/0212243 A1 | 8/2013 | Thakkar et al. |
| 2013/0212244 A1 | 8/2013 | Koponen et al. |
| 2013/0212245 A1 | 8/2013 | Koponen et al. |
| 2013/0212246 A1 | 8/2013 | Koponen et al. |
| 2013/0219037 A1 | 8/2013 | Thakkar et al. |
| 2013/0230047 A1 | 9/2013 | Subrahmaniam et al. |
| 2013/0287026 A1 | 10/2013 | Davie |
| 2013/0332602 A1 | 12/2013 | Nakil et al. |
| 2013/0332619 A1 | 12/2013 | Xie et al. |
| 2014/0247753 A1 | 9/2014 | Koponen et al. |
| 2014/0335823 A1 | 11/2014 | Heredia et al. |
| 2014/0348161 A1 | 11/2014 | Koponen et al. |
| 2014/0351432 A1 | 11/2014 | Koponen et al. |
| 2015/0010012 A1 | 1/2015 | Koponen et al. |
| 2015/0049632 A1 | 2/2015 | Padmanabhan et al. |
| 2015/0081948 A1 | 3/2015 | Thereska et al. |
| 2015/0103838 A1 | 4/2015 | Zhang et al. |
| 2015/0172422 A1 | 6/2015 | Flanagan |
| 2015/0207677 A1 | 7/2015 | Choudhury et al. |
| 2015/0319031 A1 | 11/2015 | Yip et al. |
| 2015/0319062 A1 | 11/2015 | Yip et al. |
| 2016/0094398 A1 | 3/2016 | Choudhury et al. |
| 2016/0127235 A1 | 5/2016 | Zourzouvillys |

FOREIGN PATENT DOCUMENTS

| | | |
|---|---|---|
| EP | 2748990 | 7/2014 |
| GB | 2485866 | 5/2012 |
| WO | WO 2013/063332 | 5/2013 |
| WO | WO 2013/158917 | 10/2013 |
| WO | WO 2013/158918 | 10/2013 |

(56) References Cited

FOREIGN PATENT DOCUMENTS

| WO | WO 2013/158920 | 10/2013 |
|----|----------------|---------|
| WO | WO 2013/184846 | 12/2013 |

OTHER PUBLICATIONS

U.S. Appl. No. 14/316,789, filed Jun. 26, 2014, Yip, Alexander, et al.
Author Unknown, "Private Network-Network Interface Specification Version 1.1 (PNNI 1.1)," The ATM Forum Technical Committee, Apr. 2002, 536 pages, The ATM Forum.
Author Unknown, "Virtual Machine Backup Guide," Nov. 2007, pp. 1-78, VMware, Inc., Palo Alto, California.
Belaramani, Nalini, et al., "PRACTI Replication," Proc. of NSDI, May 2006, 14 pages.
Casado, Martin, et al., "SANE: A Protection Architecture for Enterprise Networks," Proceedings of the 15$^{th}$ USENIX Security Symposium, Jul. 31, 2006, pp. 137-151.
Ciavaglia, Laurent, et al., "An Architectural Reference Model for Autonomic Networking, Cognitive Networking and Self-management," Draft ETSI GS AFI 002 V0.0.17, Mar. 2012, 179 pages, http://www.etsi.org.
Fernandes, Natalia C., et al., "Virtual Networks: isolation, performance, and trends," Annals of Telecommunications, Oct. 7, 2010, pp. 339-355, vol. 66, Institut Telecom and Springer-Verlag, Paris.
Koponen, Teemu, et al., "Onix: A Distributed Control Platform for Large-scale Production Networks," In Proc. OSDI, Oct. 2010, pp. 1-14.
Krishnaswamy, Umesh, et al., "ONOS Open Network Operating System—An Experimental Open-Source Distributed SDN OS," Apr. 16, 2013, 4 pages.
Pankaj, Berde, et al., "ONOS Open Network Operating System an Open-Source Distributed SDN OS," Dec. 19, 2013, 34 pages.
Schneider, Fred B., "Implementing Fault-Tolerant Services Using the State Machine Approach: A Tutorial," ACM Computing Surveys, Dec. 1990, 21 pages, vol. 22, No. 4, ACM.
Stribling, Jeremy, et al., "Flexible, Wide-Area Storage for Distributed Systems with WheelFS," NSDI '09: 6$^{th}$ USENIX Symposium on Networked Systems Design and Implementation, Apr. 2009, pp. 43-58, USENIX Association.
Terry, Douglas B., "Managing Update Conflicts in Bayou, a Weakly Connected Replicated Storage System," SIGOPS '95, Dec. 1995, pp. 172-183, ACM, Colorado, USA.
Portions of prosecution history of U.S. Appl. No. 14/316,786, May 20, 2016, Yip, Alexander, et al.
Portions of prosecution history of U.S. Appl. No. 14/316,786, Jun. 30, 2016, Yip, Alexander, et al.

\* cited by examiner

SECONDARY INPUT QUEUES FOR MAINTAINING A CONSISTENT NETWORK STATE

CLAIM OF BENEFIT TO PRIOR APPLICATIONS

This application claims the benefit of U.S. Provisional Patent Application 61/988,869, filed on May 5, 2014, which is incorporated herein by reference.

BACKGROUND

A network control system uses a cluster of network controllers to implement logical networks onto a physical network. One of the challenges of large networks (including datacenters and enterprise networks) is maintaining and recomputing a consistent network state in the face of various failures in the network. In some network control systems, changes are sent between different network controllers in the network control system. As changes are made in the system, a network controller may receive conflicting inputs from multiple controllers. For example, when slices (e.g., logical or physical network entities) are moved from one controller to another, there may be a period of time during which there are two controllers sending changes for the same slice. When one controller lags behind another, both controllers think they are responsible for the same slice. This may result in inconsistent state being applied at different controllers in the system.

In some network control systems, the network controller cluster computes all pending state changes in an arbitrary order such that related changes may not be processed together, resulting in inconsistent state for a period of time. For example, if the cluster is in the middle of computing a large amount of work (e.g., during slice rebalancing), and a logical network configuration change arrives that requires the replacement of a single flow in the dataplane, the cluster might delete that flow right away, and create the replacement flow much later, after the rebalancing work completes. The dataplane connectivity for that one flow would be down for the entire time while the flow is missing from the dataplane (possibly tens of minutes).

As another example, when a dataplane is already wired and working correctly, and the cluster restores from a snapshot, the cluster computes all the network state in an arbitrary order. If the cluster output tables were allowed to apply those changes to the dataplane as they are computed, the dataplane would suffer downtime during the entire computation time because the state is incomplete until the computation finishes. This does not happen in practice because the external output tables treat a snapshot restore as a special case and do not send changes to the dataplane while the cluster is working. However, it is undesirable to handle special cases like this.

In addition, in some network control systems, state is deleted inconsistently, resulting in inconsistent state. For example, when a controller sees state that the controller has not computed the need for, the controller will treat that state as garbage and delete that data lazily (but only when the cluster is idle). Treating network state as garbage and deleting it lazily can prolong dataplane incorrectness. For example, if the physical forwarding elements (PFEs) have a flow that is directing packets incorrectly and the controller did not compute the need for that flow (e.g., when the flow was not deleted or manually added), then the controller will treat that flow as garbage and not delete it for a certain period of time (e.g., at least 60 seconds). The garbage collection lag can be even longer while the cluster performs state computations. The network controllers delay garbage collection while processing the network state because the output is likely to be inconsistent until the processing is completed. The network controllers can be working for long periods of time before reaching a consistent state, prolonging the garbage collection time lag.

As another example, if the controller has computed the need for state in the past, but now decides to explicitly delete that state, the controller will delete that state from the forwarding elements immediately. In some network control systems, this distinction between garbage collection and explicit deletion is not applied consistently in the runtime, and leads to complexity and undesirable behavior. For example, when a publisher disconnects from a subscriber, the subscriber cleans up the subscription data received from the publisher after a brief time delay. The controller treats the cleaned up subscription data as explicit deletions and immediately deletes the state from the input tables even though the removal of the subscription data was not the result of a configuration change to explicitly delete the subscription data. Such deletions cause dataplane downtime whenever a subscriber loses a publisher for longer than a preset time delay. For example, when a backup controller is promoted to master before finishing the computation of the standby network state, the receiving controllers of the promoted backup controller may delete the received state from the previous master controller before the promoted standby controller can resume publishing new state.

BRIEF SUMMARY

A network control system uses a cluster of network controllers to implement logical networks onto a physical network. The network control system of some embodiments provides fixed point support to ensure a consistent state across the various elements of the network control system by ensuring that changes that individually could cause inconsistencies in the network state are processed and propagated as a single group. The fixed points not only prevent inconsistencies in the network state, but also reduce churn and improve garbage collection in the system.

In some embodiments, the network control system provides publications for managing different slices (e.g., logical and/or physical entities) of the network. The publications are published from publisher controllers in the network control system to subscriber controllers. The network control system uses publications with generation numbers and buffered subscribers to implement the fixed points in order to help maintain a consistent network state. The information published with a publication is useful for resolving conflicts in the network control system when multiple publisher controllers provide conflicting inputs to a subscriber controller.

Generation numbers allow conflicts to be resolved in a network control system, ensuring that the most current version of the state is propagated to the dataplane. Buffered subscribers buffer the inputs received from a publisher in case the publisher becomes unavailable. Rather than deleting all of the output state that is based on the published inputs, the buffered subscriber allows the subscriber to maintain the network state until an explicit change to the state is received at the subscriber from a publisher (e.g., a restarted publisher, a backup publisher, etc.).

In addition to the publications, the network control system of some embodiments uses secondary input queues along with the fixed points. In some embodiments, a network controller uses secondary input queues to receive and store inputs from multiple input sources prior to moving the inputs to a primary input queue for processing. The secondary input queues provide a separate storage for each input source so that the inputs from the different sources do not get mixed with each other to ensure that fixed points and barriers sent to the controller maintain their integrity.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

A network control system uses a cluster of network controllers to implement logical networks onto a physical network. While the various network controllers process different portions of the network state, the network state may become temporarily inconsistent (i.e., the forwarding of packets in the physical network does not conform to the defined logical network). In order to prevent these inconsistent views of the network from being propagated in the network control system, the network control system propagates changes at fixed points. Fixed points are points during processing of network state when the network state is consistent. The network control system of some embodiments provides fixed point support to ensure a consistent state across the various elements of the network control system. In some embodiments, the network control system provides publications for managing different slices (e.g., logical and/or physical entities) of the network.

Publications are published from publisher controllers in the network control system to subscriber controllers. The network control system uses publications with generation numbers and buffered subscribers to implement the fixed points in order to help maintain a consistent network state. In addition to the publications, the network control system of some embodiments uses secondary input queues and barriers to implement the fixed points. The fixed points not only prevent inconsistencies in the network state, but also reduce churn and improve garbage collection in the system.

Details and examples of a network control system that provides fixed point support are described below. Specifically, Section II describes the use of fine grained dataplane fixed points in a network control system. Section III describes the use of buffered subscribers in the network control system. Finally, Section IV describes computer systems and processes used to implement some embodiments of the invention. However, before describing the use of fixed points, the environment in which some embodiments of the invention are implemented will be described below in Section I.

I. Network Control System

A. Environment

Figure 1:
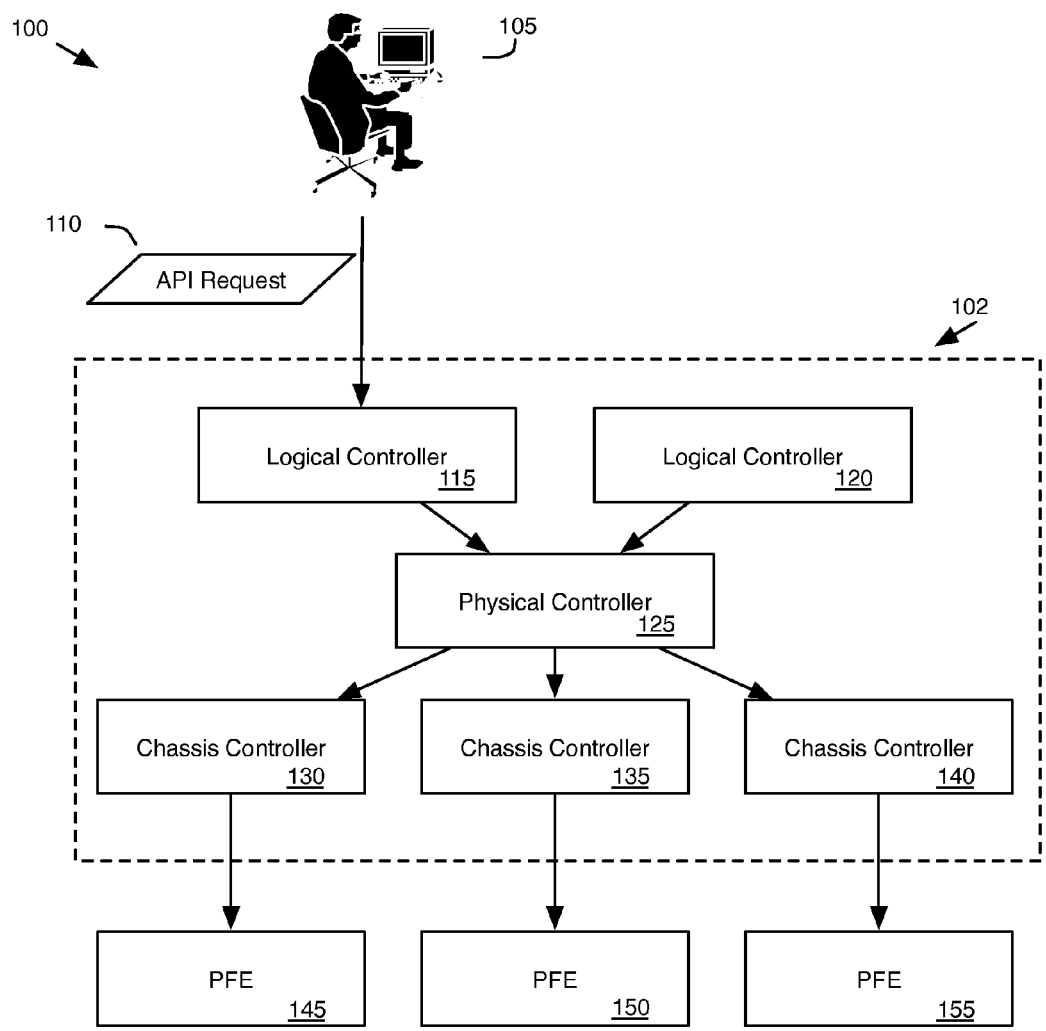
FIG. 1 illustrates an example architecture of a network control system.

FIG. 1 illustrates an example architecture of a network control system 100. In particular, this figure illustrates a network hierarchy with different elements of the network control system 100 for implementing a logical network onto a physical network. This figure shows a user 105 sending an API request 110 into a controller cluster 102 of the network control system 100 to implement a logical network on physical forwarding elements (PFEs) 145, 150, and 155. The controller cluster 102 includes logical controllers 115 and 120, physical controller 125, and chassis controllers 130, 135, and 140. One of ordinary skill in the art will recognize that many different combinations of the controllers, forwarding elements, and machines other than the ones shown are possible for the network control system 100. For example, although only one physical controller 125 is shown FIG. 1, some implementations of a network control system will use multiple physical controllers that communicate with multiple logical and chassis controllers.

The controller cluster 102 of the network control system 100 of some embodiments includes several different controllers for managing the network control system. In some such embodiments, the controller cluster 102 includes different groups of controllers, with each group having different types of responsibilities (e.g., logical, physical, and chassis controllers). Some embodiments implement the different groups of controllers as a controller cluster in a dynamic set of physical servers, in which controllers can be dynamically added or removed from the cluster. Thus, as the size of the deployment increases, or when a particular controller or physical server on which a controller is operating fails, the cluster and responsibilities (or slices) within the cluster are redistributed among the remaining active controllers.

In the example of FIG. 1, the network control system includes three types of controllers, logical controllers 115 and 120, physical controller 125, and chassis controllers 130, 135, and 140, each with different responsibilities. The different controllers compute (or generate) various changes to be propagated to the network state. In some embodiments, the logical controller 115 is responsible for a particular logical datapath set (LDPS) (not shown) for user 105. The logical controller 115 generates physical control plane (PCP) data for managing the PFEs 145, 150, and 155 based on user inputs for the particular LDPS. The logical controller 115 of some embodiments generates logical control plane (LCP) data based on user inputs. A control module (not shown) of the logical controller 115 then uses the generated LCP data to generate logical forwarding plane (LFP) data. In some embodiments, a virtualization module (not shown) of the logical controller 115 generates universal PCP data from the LFP data.

Once the logical controller 115 has generated the physical control plane data, the logical controller 115 identifies the master physical controllers of the PFEs that implement the LDPS. In this example, the logical controller 115 identifies the physical controller 125 because the chassis controllers 130, 135, and 140 are configured to implement the LDPS specified by the user 105. The logical controller 115 sends the generated universal PCP data to the physical controller 125.

The physical controller 125 can be a master of one or more chassis controllers. In this example, the physical controller 125 is the master of chassis controllers 130, 135, and 140 that manage PFEs 145, 150, and 155 respectively. Physical controllers in different embodiments have different responsibilities. In some embodiments, the physical controller 125 forwards the universal flow entries it receives from the logical controllers 115 and 120 to the chassis controllers 130, 135, and 140.

Chassis controllers 130, 135, and 140 are each responsible for generating the customized flow entries for a particular PFE 145, 150, and 155 respectively. Each of the chassis controllers 130, 135, and 140 generate the customized flow entries from the universal flow entries and push these customized flow entries to the corresponding PFEs 145, 150, and 155. In some embodiments, PFEs are virtual switches that operate on a host machine. In some of these embodiments, each chassis controller resides on the same host machine as a corresponding PFE.

The division of the different responsibilities may vary in different embodiments. In some embodiments, physical controllers are responsible for generating the customized flow entries for some PFEs, while directing chassis controllers to generate such flow entries for other PFEs.

In other embodiments, rather than chassis controllers, each physical controller is a master of a set of PFEs. As the master of a set of PFEs, the physical controllers of some embodiments generate, from the received universal PCP data, customized PCP data specific for each of the PFEs. In some embodiments, multiple physical controllers can be the masters of the same PFEs. The controllers of the network control system in some embodiments use a protocol, such as OpenFlow, to communicate with the PFEs.

Depending on the size of the deployment managed by a controller cluster, any number of each of the different types of controller may exist within the cluster. In some embodiments, a leader controller has the responsibility of partitioning the load over all the controllers. The leader controller effectively assigns (1) a list of LDPSs for each logical controller to manage and (2) a list of PFEs for each physical controller to manage.

In some embodiments, the results for the computations performed by the controllers to generate changes to the network state (e.g., flow entries) are not limited to flowing from the top of the hierarchy towards the PFEs. Rather, the computation results may flow in the opposite direction, from the PFEs up to the logical controllers. For instance, a physical controller receives configuration information (e.g., identifiers of virtual network interfaces (VIFs)) of the PFEs. The physical controller maintains the configuration information and also sends the information up to the logical controllers so that the logical controllers have the configuration information of the PFEs in order to implement the LDPSs for which the logical controllers are masters.

Each of the PFEs 145, 150, and 155 generates physical forwarding plane (PFP) data from the customized PCP data received from the chassis controllers 130, 135 and 140. The PFP data defines the forwarding behavior of the PFE. In other words, each PFE populates a forwarding table with PFP data based on the customized PCP data. The PFEs 145, 150, and 155 forward packets among the host machines (not shown) according to the populated forwarding tables.

The architecture 100 described in FIG. 1 is only one example of a network control system. It should be apparent to one skilled in the art that the invention is not limited to the described network control system. In some embodiments, the roles performed by the different layers of the network control system may vary. In addition, some embodiments of the network control system may include more or fewer layers of processing.

B. Controller Architecture

Figure 2:
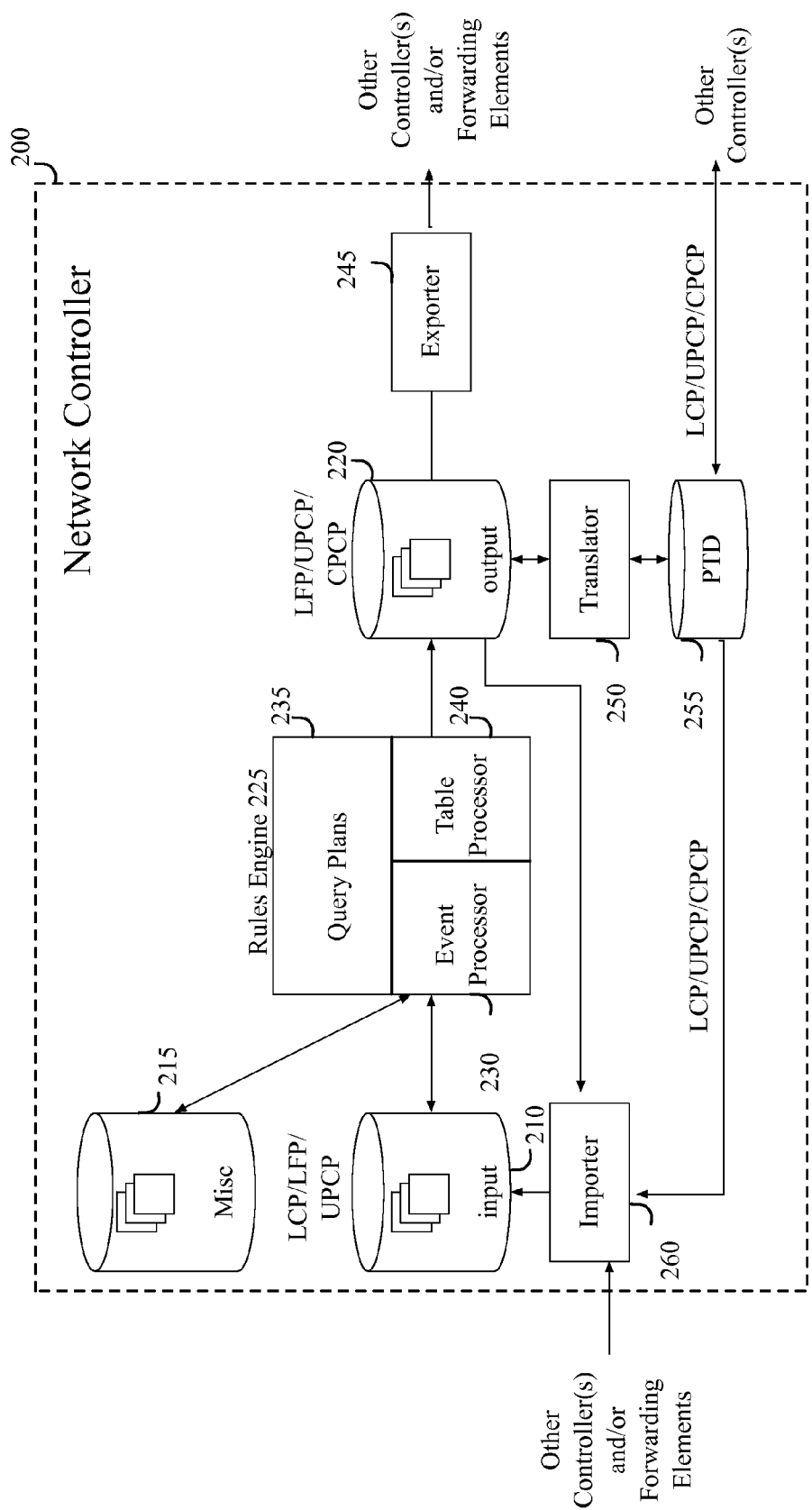
FIG. 2 illustrates an example architecture of a network controller.

As described above, each of the controllers in a controller cluster may perform different duties with different responsibilities. FIG. 2 illustrates an example architecture of a network controller 200 (e.g., a logical controller or a physical controller). Network controllers receive inputs related to a set of responsibilities of the network controller to generate outputs that reflect the results of the received inputs. The network controller of some embodiments uses a table-mapping engine to map data from an input set of tables to data in an output set of tables. The network controller 200, as shown, includes input tables 210, miscellaneous tables 215, a rules engine 225, output tables 220, an importer 260, an exporter 245, a translator 250, and a persistent data storage (PTD) 255.

The input tables 210 of some embodiments store information regarding the logical forwarding element configurations (e.g., access control list table configurations, L2 table configurations, L3 table configurations, etc.) that the user defines without referencing any operational state of the switching elements in a particular network configuration. In some embodiments, the input tables 210 are populated based on input received from a user. The input tables 210 may also receive inputs from other processes or modules running in the network control system. For example, the input tables 210 may also receive updates due to workload operational changes that result in a change to the forwarding state. For instance, when a virtual machine migrates from a first node to a second node, the logical view remains unchanged. However, the forwarding state requires updating due to the migration, as the logical port to which a virtual machine (VM) attaches is now at a different physical location. Also, physical reconfiguration events, such as the addition, removal, upgrade and reconfiguration of PFEs, may result in changes to the forwarding state. The input tables of some embodiments include changes to the LDPSs as well as changes to the physical elements (e.g., a forwarding element) on which the logical elements are implemented.

In some embodiments, the input tables 210 include tables with different types of data depending on the role of the controller 200 in the network control system. For instance, in some embodiments the input set of tables 210 in a controller includes logical control plane (LCP) data to be mapped to logical forwarding plane (LFP) data or LFP data to be mapped to universal PCP data when the controller 200 is a logical controller, while the input set of tables 210 includes universal PCP data to be mapped to customized PCP data when the controller is a chassis (or physical) controller.

In addition to the input tables 210, the network controller 200 includes other miscellaneous tables 215 that the rules engine 225 uses to gather inputs for its table-mapping operations. These miscellaneous tables of some embodiments include constant tables that store defined values for constants that the rules engine 225 needs to perform its table-mapping operations (e.g., the value 0, a dispatch port number for resubmits, etc.). The miscellaneous tables of some embodiments further include function tables that store functions that the rules engine 225 uses to calculate values to populate the output tables 220.

In addition, in some embodiments, the nLog engine (further described below) also uses data from a configuration database, or other database external to nLog, to generate output from the given inputs. The network controller of some embodiments provides internal tables (e.g., C++ backed tables) that store additional state beyond the records (i.e., tuples) stored in the nLog tables.

In some embodiments, the configuration information is stored in a separate configuration database. As another example, in some embodiments of the invention, the controller needs several classes of information from the PFEs via a configuration database to compute the state it pushes to the PFEs. In several cases the controller requests the creation of rows in a configuration database, and waits for a resulting update from the configuration database before the controller can complete the computation.

In some embodiments, a controller requests things like port numbers from chassis controllers or directly from the PFEs, and requires the response to arrive before processing on the controller can continue. The controller of some embodiments communicates with the PFEs to perform various functions and must wait for corresponding responses from the PFEs in order to implement logical networks on the physical forwarding elements.

For example, when the controller creates a tunnel port, queue, or queue collection, the controller needs to wait for a tunnel port number, queue ID and number, or queue collection ID respectively. When the controller creates a "pool" bridge, the controller waits for an engine Universally Unique Identifier (UUID) and datapath ID. The controller uses these IDs for configuring the OpenFlow stack. External updates from the forwarding element configuration include VIF Media Access Control (MAC) addresses, VIF port numbers, VIF interface IDs, engine UUIDs (including HV integration bridge), and engine datapath IDs (including HV integration bridge). The engine UUIDs of some embodiments are replaced with an integration bridge ID and/or a chassis ID. Engine datapath IDs of some embodiments go directly to an OpenFlow stack. Also, the controller should ask to create gateways (currently gateway creates its own bridge).

Like the input tables 210, the output tables 220 include tables with different types of data depending on the role of the controller 200. For example, when the controller 200 functions as a logical controller, the output tables 220 include LFP data and universal PCP data, whereas when the controller 200 functions as a physical controller, the output tables 220 include customized PCP data. The output tables 220 of some embodiments may also serve as input tables for other queries. The output tables 220 include head tables, or tables that contain the final results and are no longer changed until new inputs are received.

In some embodiments, the output tables 220 can be grouped into several different categories. For instance, in some embodiments, the output tables 220 can be rules engine (RE) input tables (i.e., intermediate tables) and/or RE output tables. An output table is an RE input table when a change in the output table causes the rules engine 225 to detect an input event that requires the execution of a query plan. An output table can also be an RE input table that generates an event that causes the rules engine to perform another query plan. An output table is an RE output table when a change in the output table causes the exporter 245 to export the change to another controller or a PFE. An output table can be an RE input table, an RE output table, or both an RE input table and an RE output table.

The rules engine 225 performs table-mapping operations that specify one manner for converting input data to output data. Whenever one of the input tables is modified (referred to as an input table event), the rules engine 225 performs a set of table-mapping operations that may result in the modification of one or more data tuples in one or more output tables.

The rules engine 225 includes an event processor 230, a set of query plans 235, and a table processor 240. Each query plan is a set of rules that specifies a set of join operations that are to be performed upon the occurrence of an input table event. The event processor 230 of the rules engine 225 detects the occurrence of each such event. In some embodiments, the event processor 230 registers for callbacks with the input tables 210 for notification of changes to the records in the input tables 210, and detects an input table event by receiving a notification from an input table when one of its records has changed (e.g., when a logical controller is removed, ports on a PFE are changed, etc.).

In response to a detected input table event, the event processor 230 (1) selects an appropriate query plan from the query plans 235 for the detected table event, and (2) directs the table processor 240 to execute the query plan. To execute the query plan, the table processor 240, in some embodiments, performs the join operations specified by the query plan to produce one or more records that represent one or more sets of data values from one or more input and miscellaneous tables 210 and 215. The table processor 240 of some embodiments then (1) performs a select operation to select a subset of the data values from the record(s) produced by the join operations, and (2) writes the selected subset of data values in one or more output tables 220.

Some embodiments designate the first join operation that is performed by the rules engine 225 for an input event to be based on an LDPS parameter. This designation ensures that the rules engine's join operations fail and terminate immediately when the rules engine has started a set of join operations that relate to a LDPS (i.e., to a logical network) that is not managed by the controller 200.

Some embodiments allow application developers to create the rules engine 225 for the controller using a variation of the datalog database language referred to herein as nLog. nLog allows an application developer to specify the manner by which the controller maps logical datapath sets to the controlled physical switching infrastructure. Like datalog, nLog provides a few declaratory rules and operators that allow a developer to specify different operations that are to be performed upon the occurrence of different events. In some embodiments, nLog provides a limited subset of the operators that are provided by datalog in order to increase the operational speed of nLog. For instance, in some embodiments, nLog only allows the AND operator to be used in any of the declaratory rules.

The declaratory rules and operations that are specified through nLog are then compiled into a much larger set of rules by an nLog compiler. In some embodiments, this compiler translates each rule that is meant to address an event into several sets of database join operations. Collectively the larger set of rules forms the table-mapping rules engine that is referred to as the nLog engine.

Once the rules engine 225 produces the outputs to the output tables 220, the exporter 245 detects the changes to the output tables 220 and propagates the changes to the next level of the hierarchy (i.e., another controller or a PFE). In some embodiments, the exporter 245 registers for callbacks with the output tables 220 for notification of changes to the records of the output tables 220. In such embodiments, the exporter 245 detects an output table event when it receives notification from an output table that one of the records in the output table has changed.

The exporter 245 then takes each modified data tuple in the modified RE output tables and propagates this modified data tuple to one or more other controllers or to one or more PFEs. When sending the output table records to another controller, the exporter 245 in some embodiments uses a single channel of communication (e.g., a Remote Procedure Call (RPC) channel) to send the data contained in the records. When sending the output table records to PFEs, the exporter in some embodiments uses two channels. One channel is established using a switch control protocol (e.g., OpenFlow) for writing flow entries in the control plane of the PFE. The other channel is established using a database communication protocol (e.g., JSON) to send configuration data (e.g., port configuration, tunnel information). Details of the network controller of some embodiments are described in U.S. Patent Publication 2013/0058228, filed Jul. 6, 2011 and published on Mar. 7, 2013. This publication is incorporated herein by reference.

II. Fixed Point Support

The network control system of some embodiments provides fine-grained fixed point support to resolve or prevent inconsistencies in the dataplane. By processing the inputs with fixed points, the network control system of some embodiments ensures that changes that could cause inconsistencies in the network state are processed and propagated together. By propagating changes at fixed points, the network control system ensures that only consistent views of the network state are calculated and propagated to the dataplane. In order to implement these fixed points, the network control system of some embodiments uses publications and barriers.

A. Publications

The network control system of some embodiments uses publications to communicate information between the controllers of the controller cluster. A publication is a collection of tuples, and is the unit of data to which a subscriber controller subscribes. More than one subscriber may subscribe to the same publication, but each subscriber need not subscribe to all publications in a slice. In some embodiments, the publisher for a particular publication is a controller that generates network state data for that publication, while the subscriber for the publication is another controller that receives the published data and acts upon that data. In some embodiments, some of the subscribers are not controllers in the network control system. For example, a PFE may subscribe to publications from a chassis controller (or physical controller) in order to receive flow entries for managing packets at the PFE.

Publisher and subscriber controllers may serve many different roles in the network control system. As described above, the network control system of some embodiments includes physical controllers, logical controllers, and chassis controllers. Each of these controllers may be a publisher controller, a subscriber controller, or both a publisher and a subscriber controller. For example, a chassis controller may operate as a subscriber controller to receive physical forwarding data from a physical controller, while also operating as a publisher controller to publish physical forwarding element data to the physical controller.

Each publication only belongs to one slice (e.g., a logical and/or physical entity) of the logical or physical network. A publication in some embodiments cannot move from one slice to another. A slice may have multiple publications, where each publication represents a different portion or stage of the slice. For example, in some embodiments, a slice representing a particular logical datapath set (LDPS) may have one publication for data published by the logical controllers to the physical controllers and another publication for the data published by the physical controllers to the chassis controllers. In the example of a master controller publishing to a slave controller, the publication may represent a copy of all (or a portion) of the data stored on the master controller.

The publisher controller for each slice will also maintain a version number for each publication. A version number is a triplet containing the slice name, a generation number, and a counter. For example, "slice:logical:34" corresponds to the logical slice 34, and produces the publications containing logical flows from logical slice 34. If controller A is master for logical slice 34, then controller A will be the publisher for slice:logical:34. If controller B becomes the master (e.g., when controller A fails or shuts down), then controller B will become the publisher for slice:logical:34. In some embodiments of the network control system, a slice may have more than one publisher at a time for a single publication in order to implement active-active controllers. In other embodiments, each publication will only have a single master publisher controller at any time.

Each chassis controller will also publish a slice, for example chassis controller 1234 publishes slice "slice:chassis:1234". A chassis slice will always have a single publisher, because each chassis controller is its own publisher. The publisher for a chassis slice might be offline for a long period of time if the chassis controller is down.

It must be possible for a single source to provide an entire publication (i.e. a publication cannot be composed of input from two different sources). For example, a publication ID could be a chassis ID, a logical slice, a logical switch, or a VIF ID (e.g., for a chassis' VIF-location table). This property ensures that nLog will make changes to a publication only within a single fixed point because a single data source is responsible for each entire publication. By making changes within a fixed point, it ensures that inconsistent changes are not propagated to the dataplane.

Publications are published from a publishing controller to a subscribing controller up, down, and across the hierarchy. For example, logical controllers may both publish and subscribe to several physical controllers. Some controllers will also publish and subscribe to other controllers at the same level of the hierarchy. For example, in some embodiments a master controller (e.g., a master logical or physical controller) will publish a publication of network state to a slave controller that performs a similar function.

Fixed points of some embodiments allow for more efficient garbage collection because each publication from a publisher presents an entire view of the state for that publication. Fine grained dataplane fixed points of some embodiments eliminate the arbitrarily long garbage collection time lag because the controller will always have a consistent network state image. Any state absent from the network state publication can be deleted immediately. Using fine grained fixed points in some embodiments can also eliminate downtime caused by subscriber table cleanup if the cluster combines the deletion of subscriber tuples with the insertion of replacement subscriber tuples in a single fixed point.

For example, each physical controller is responsible for relaying publications from all logical slices. Therefore, when a chassis controller receives a set of publications from a physical controller, the update is complete (meaning all logical slices are included in the update) and the chassis controller need not receive publications from any other physical controller. This means that if a buffered publication is absent from the set of publications, the chassis may delete the publication.

Although fixed points allow for more efficient garbage collection, it is still possible for various modification functions (e.g., create( ), modify( ), or delete( )) to fail, and those tuples will end up in some form of a pending list. Similarly, since an operator can still manually change OVSDB and OpenFlow tables, the output tables still need to have the notion of "extra" tuples that are subject to garbage collection. In some embodiments, garbage collection is still performed to collect these tuples.

Generation numbers allow conflicts to be resolved in a network control system, ensuring that the most current version of the state is propagated to the dataplane. On a cluster controller, the generation number advances each time the slice allocation changes. On a chassis controller, the generation number advances each time the chassis controller boots. The generation number in some embodiments does not decrease because subscribers always prefer a publication with a higher version number for a given slice. If a chassis generation number goes down, the subscribers will choose stale publications in conflict situations. Accordingly, the system of some embodiments warns operators when publication updates consistently arrive with smaller version numbers, and provides an option to manually change the generation number. In some embodiments, the network control system provides a scheme to allow generation numbers and counters to roll over.

To ensure that the generation numbers only increase, the controller cluster will store a generation number (starting at 1) for each configured chassis controller in a configuration database (e.g., CDB). Each controller receives this number from the configuration database via a publication. When a chassis controller starts, it starts with generation number 0 until it receives a publication containing the generation number from the configuration database. When the generation number arrives, the chassis controller increments the generation number and publishes the new generation number up to the logical controllers. This ensures that the chassis generation number only increases as long as the configuration database retains its state.

On both cluster controllers and chassis controllers, the counter increments each time the publisher publishes a fixed point. As an example if the generation number is 5 and counter is 10233 on chassis controller "foo," the version number is "(slice:chassis-foo, 5, 10233)." A controller manages publications each having an id and a value.

Logical controllers send publications to all physical controllers. Physical controllers forward logical publications to chassis controllers without altering the publications. When a logical publication passes through the physical controller, the publication's logical slice does not change; the publication arrives at the chassis controller with its original logical slice. Therefore physical slices contain no publications. Each physical controller is responsible for relaying publications from all logical slices.

Figure 3:
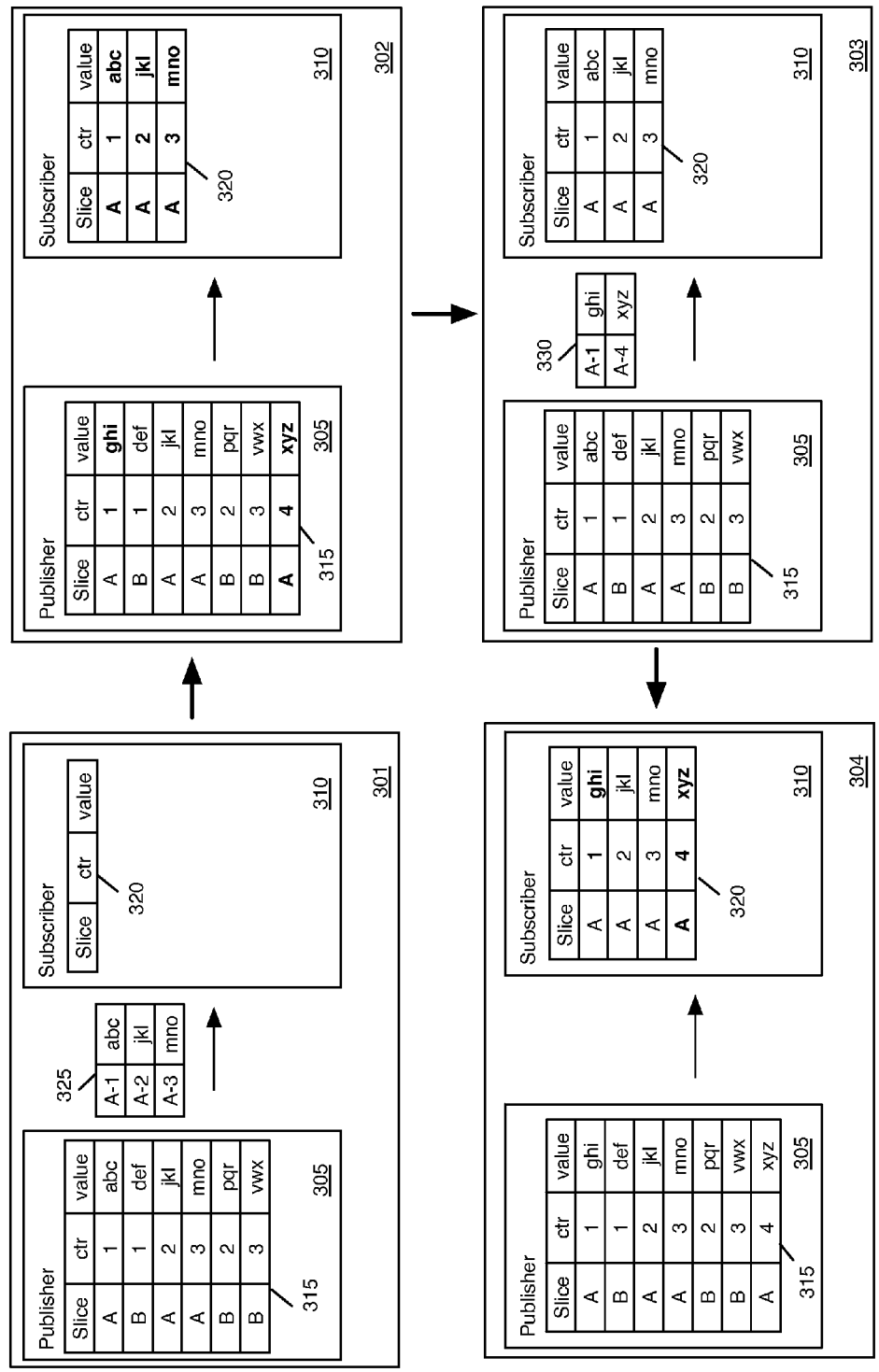
FIG. 3 illustrates an example of publishing a publication to subscribers.

FIG. 3 illustrates an example of publishing a publication to subscribers in four stages 301-304. The network control system of some embodiments publishes the publications (and updates) between controllers using fixed points in order to maintain a consistent state in the network. Such publications may be published between different levels of the network hierarchy (e.g., between logical and physical controllers) or between controllers at a single level of the network hierarchy (e.g., between master and slave (i.e., standby) physical controllers).

The first stage 301 shows a publisher 305 and a subscriber 310. Publisher 305 includes table 315 for storing publication data to be published by the publisher 305. The table 315 shows tuples for multiple slices, A and B. Each slice has tuples with a counter and a value. Each publisher may be responsible for multiple slices and each slice may include multiple publications. Each publication is made up of a series of tuples.

Subscriber 310 includes table 320 for storing the data published by the publisher 305. In the first stage 301, table 320 has not received any records from publisher 305. In this example, subscriber 310 is only subscribed to publication A from publisher 305, but it should be apparent to one skilled in the art that a subscriber may receive one or more publications from one or more publisher controllers. In the first stage 301, because subscriber 310 does not have any of the data for publication A, publisher 305 publishes the entire publication 325 (i.e., tuples A-1, A-2, and A-3) to subscriber 310.

The second stage 302 shows that subscriber 310 has been updated with the publication 325 of slice A. In addition, the network state on the publisher 305 has been updated. More specifically, the state on the publisher now includes a new tuple A-4 and a modified version of tuple A-1 in which the value for modified tuple A-1 has changed from "abc" to "ghi".

In the third stage 303, publisher 305 publishes an update 330 that includes only the new and updated tuples A-1 and A-4 to subscriber 310. Publisher 305 does not re-publish any tuples that are unchanged and that have already been published to subscriber 310.

Finally, the fourth stage 304 illustrates that subscriber 310 has been updated with the new and updated tuples A-1 and A-4 of update 330. Subscriber 310 has a current view of the network state for slice A.

B. Barriers

The fixed point mechanism of some embodiments works by separating tuples in the input queue of a controller with barriers. Barriers indicate the end of a series of tuples that should be processed together to maintain consistency in the network control system. As a simple example, a logical network configuration change arrives (e.g., through a user request) that requires the replacement of a single flow in the dataplane. Without fixed points, the cluster might delete that flow right away, but never create the replacement flow (e.g., if a controller crashes while calculating the network state) or create the replacement flow much later. The dataplane connectivity for that one flow would be down for the entire time, while the flow is missing from the dataplane. By inserting a barrier after the requests to delete and insert the new tuple, the network control system ensures that neither of the changes is made without the other.

In some cases, however, some input queues will not use barriers. For example, some input queues (i.e., internal input queues) do not have external effects that are pushed to the dataplane, but rather produce outputs (e.g., for intermediate tables) that require further processing by the rules engine. In order to ensure that such changes do not delay the processing of a fixed point, such internal input queues in some embodiments do not use barriers at all. Rather, they will immediately compute outputs as the inputs are received. As another example, there are also some output tables that output to a centralized data storage (e.g., a Network Information Base (NIB)) for API calls to read information about the network state. These tuples can apply changes to the NIB right away with no buffering since they do not affect the data plane.

In the past, output tables in some network control systems would detect whether a controller or PFE was busy (e.g., using hypervisor::is_busy( )) as a crude approximation for a fixed point. Output tables would then avoid garbage collection while nLog was busy because deleting while processing could cause inconsistencies in the network state.

In some embodiments, the network control system publishes both the publications and any updates to the publications to subscribing controllers at fixed points in the processing. The fixed points are defined by barriers, breaking up the tuples into groups. Fixed points prevent any inconsistencies within a group of tuples by ensuring that the group of tuples is processed together. By ensuring that the tuples of a fixed group are processed together or not at all, the network state will remain in a consistent state whether or not the fixed point is applied to the network state.

Some embodiments of the network control system use barriers to indicate fixed points in the system. The network controllers use a barrier( ) message to indicate that nLog has reached a fixed point. The network controllers of some embodiments transmit barriers in the publish-subscribe channel between the different parts of the network hierarchy. A receiving runtime (e.g., a subscriber controller) processes the received input tuples as groups defined by the barriers. The changes included in the fixed point can be applied immediately to the network state even if nLog is busy because the fixed point ensures that the network state is in a consistent state as long as the changes of the fixed point is either fully applied or not applied at all.

The fixed point mechanism works by separating tuples in the nLog input queue with barriers. The network control system implements a fixed point barrier mechanism in the controllers of the controller cluster. Nlog moves all queued tuples within a fixed point into the nLog scheduler and processes them until the runtime becomes idle (e.g., no tuples remain in the scheduler, no outstanding context requests, no pending tables, etc.). A controller in the network control system of some embodiments inserts a fixed point (a set of one or more tuples plus a barrier) into nLog so that the resulting changes (i.e., flow and configuration) arrive at each destination without being mixed up with changes from another fixed point.

Figure 4:
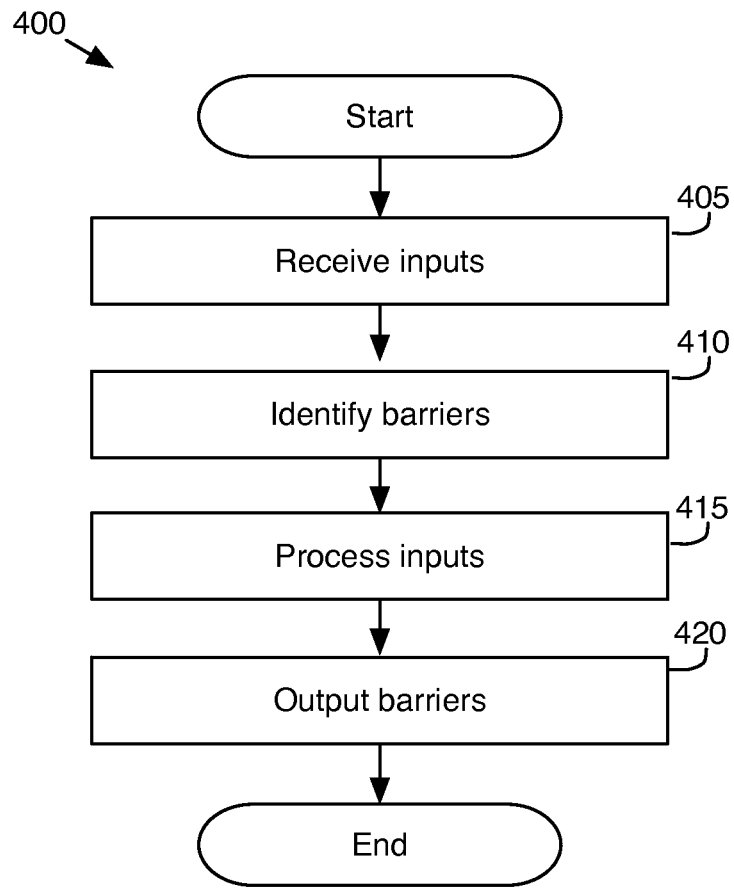
FIG. 4 conceptually illustrates a process of some embodiments for processing inputs using fixed points.
Figure 5:
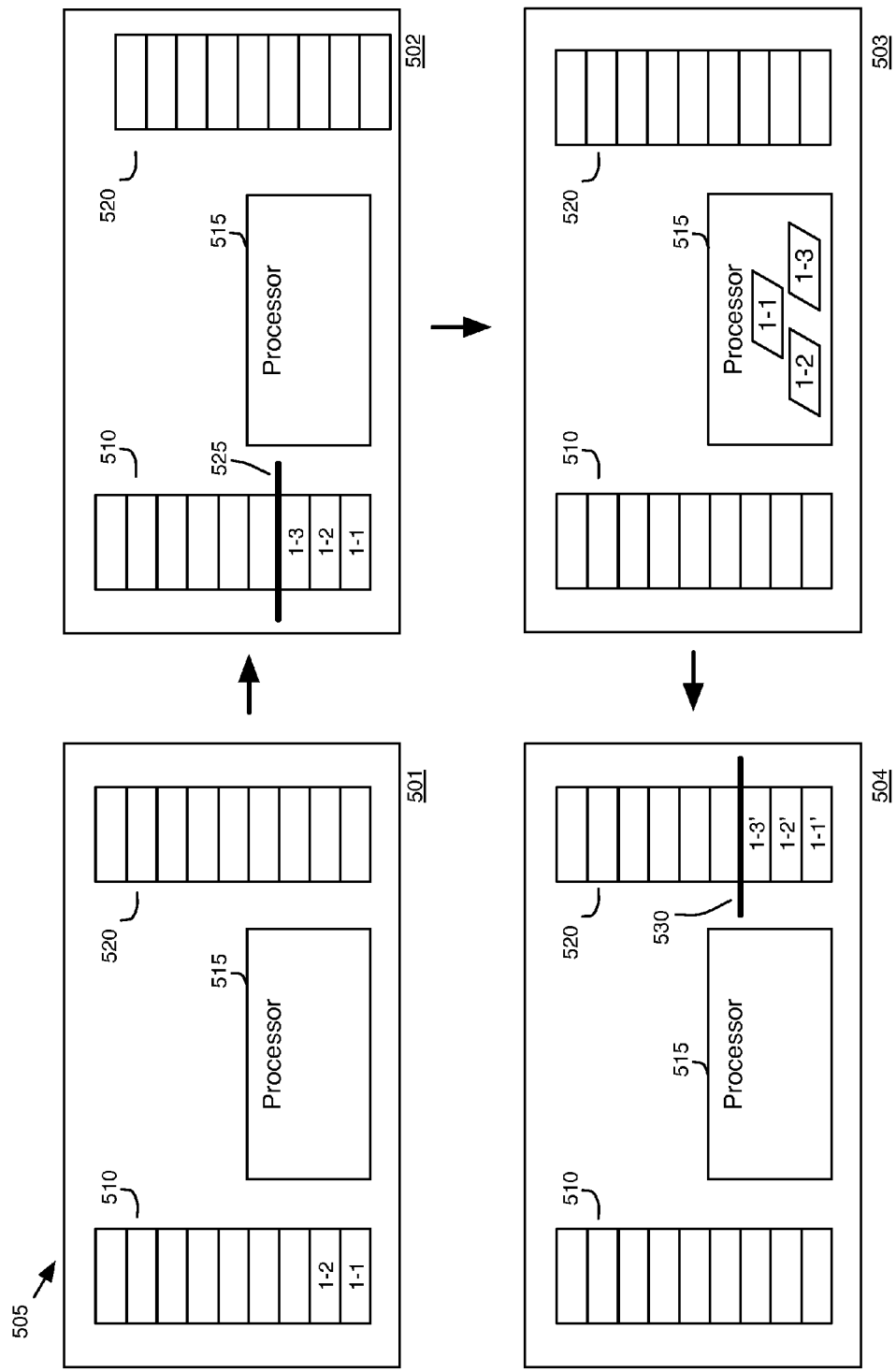
FIG. 5 illustrates an example of using barriers to create fixed points in a controller.

FIG. 4 conceptually illustrates a process 400 of some embodiments for processing inputs using fixed points. The process 400 may be performed by the different controllers of a controller cluster in a network control system. FIG. 4 will be described with reference to FIG. 5. FIG. 5 illustrates an example of using barriers to create fixed points in a controller in four stages 501-504.

The process 400 receives (at 405) inputs from a set of sources. The types of the inputs as well as the types of sources will differ for the different types of controllers. For example, a logical controller may receive different types of inputs from multiple sources, such as API requests from a user, VIF data from a set of physical controllers, and backup data from a master logical controller. A chassis controller, on the other hand, will primarily receive physical control plane data as input from a single associated physical controller. The first stage 501 illustrates a controller 505, which includes an input queue 510, a processor 515, and an output queue 520. In the first stage 501, input queue 510 has received input tuples 1-1 and 1-2.

Once the process 400 has received the inputs, the process 400 then identifies (at 410) barriers for the input. As with the received inputs, identifying the barriers will also differ for the different types of controllers. For example, some of the input sources (e.g., a logical controller) will send barriers along with the inputs, whereas other sources (e.g., API requests) may not include barriers with the inputs. When a source does not send barriers directly, the process 400 in some embodiments detects when the source becomes idle and inserts a barrier for the received inputs. In the second stage 502 of FIG. 5, the input queue 510 receives an additional tuple 1-3 and a barrier 525 is identified in the input queue 510.

The process 400 then processes (at 415) the received inputs according to the identified barriers. The third stage 503 shows that the received input tuples 1-1, 1-2, and 1-3 are being processed as a group by the processor 515.

The process 400 then outputs (at 420) a barrier with the received outputs to the output queue. When the barrier is detected on the output queue, the output tuples are ready to be flushed with the barrier to a subsequent part of the network control system (e.g., to another controller or to the PFEs). The fourth stage 504 of FIG. 5 shows that input tuples 1-1, 1-2, and 1-3 have been processed to produce output tuples 1-1', 1-2', and 1-3'. Although in this example, each input tuple produces a single corresponding output tuple, this is merely shown as an example. In some embodiments, a single tuple may produce multiple output tuples or no output tuples at all. In addition, the fourth stage 504 shows that barrier 530 has been inserted in the output queue 520 to indicate that a fixed point has been reached for the generated output and that the generated output is ready to be flushed to an output destination. In some embodiments, the fixed point in the output queue 520 is determined based on the fixed point in the input queue 510. The process 400 then ends.

In some embodiments, progress of the fixed point processing is exposed to the outside world so that users of the network control system will know if and when their fixed points are propagated to the PFEs. Each network controller provides two monitor values for tracking the fixed point progress, (1) the last barrier number inserted into the nLog input queue, and (2) the last barrier number sent to the output tables. Each of the steps of process 400 will be described in further detail below.

1. Receive Inputs

The network controller of some embodiments receives inputs from various sources (e.g., an API (either directly or via CDB import), CDB import input-tables, OVSDB input-tables, subscriber tables, etc.) to generate outputs. The CDB allows API requests to be received by a logical controller. In some network control systems, it is difficult to maintain the separation between the different fixed points from the different input sources. In order to maintain the separation, the network control system of some embodiments provides a separate secondary input queue for each different source (e.g., API requests, CDB, OVSDB, and subscriber tables). The tuples from each of the separate secondary input queues will only move to the primary input queue when a barrier is detected in the secondary input queue for at least one of the input sources. This prevents tuples in a fixed point from one source from mixing with tuples of another fixed point.

Figure 6:
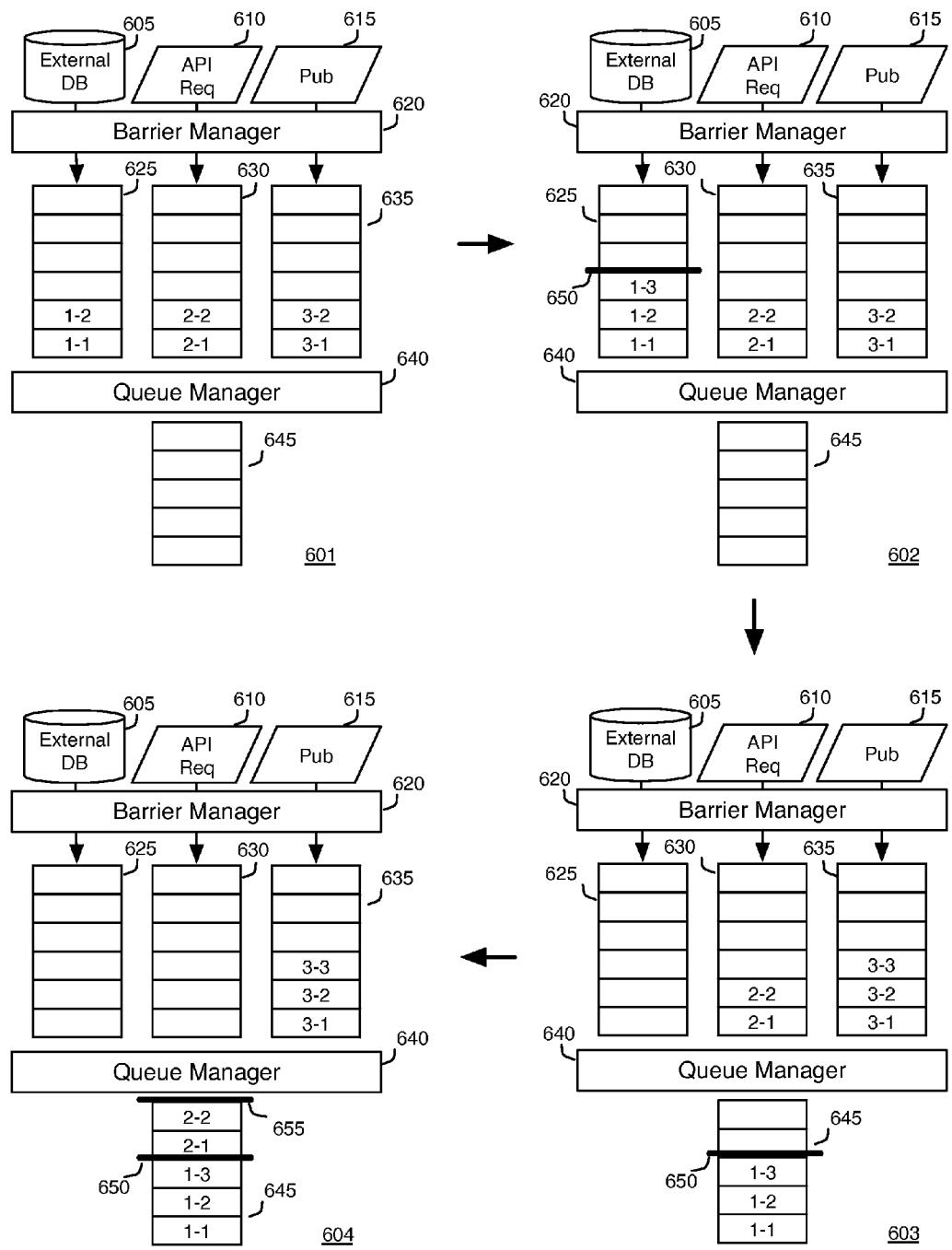
FIG. 6 illustrates an example of using a queue manager and secondary input queues to process fixed points from multiple sources.

FIG. 6 illustrates an example of using a queue manager and secondary input queues to process fixed points from multiple sources. The first stage 601 shows three input sources, external database 605, API request 610 and publisher 615, as well as barrier manager 620, queue manager 640, and primary input queue 645. The figure also shows secondary input queues 625, 630, and 635 associated with the external database 605, API request 610, and publisher 615 respectively. Secondary input queue 625 has received tuples 1-1 and 1-2 from external database 605. Secondary input queue 630 has received tuple 2-1 and 2-2 from an API request 610. Secondary input queue 635 has received tuples 3-1 and 3-2 from publisher 615. No barriers have been received by any of the secondary input queues.

In the second stage 602, secondary input queue 625 has received another tuple 1-3 and a barrier 650. In this example, barrier 650 is received directly from external database 605 along with the input tuples. In the third stage 603, the queue manager 640 detects the barriers and moves input tuples from secondary input queue 625 into the primary input queue 645. In addition, secondary input queue 635 has received an additional tuple 3-3 from publisher 615.

In some embodiments, when an input source does not provide barriers, the barrier manager 620 will identify a fixed point and insert a barrier. In the fourth stage 604, the barrier manager 620 has detected that a fixed point has been reached for secondary input queue 630 because secondary input queue 630 has not received any additional tuples for a particular period of time. Barrier managers of other embodiments may use other methods for determining that a fixed point has been reached for a secondary input queue. The fourth stage 604 shows that queue manager 640 has moved the input tuples 2-1 and 2-2 from secondary input queue 630 into the primary input queue 645 and inserted a barrier 655 to indicate the fixed point. The input tuples are ready to be processed to generate output.

Even when the fixed points of different input sources are maintained, the subscriber table of a network controller may receive conflicting inputs from multiple publishers for a particular publication. For example, when slices are moved from one publisher controller to another, there may be a period of time during which there are two publisher controllers for the same slice. One challenge that arises with publish-subscribe channels is that a slice can move from one publisher to another as the slice manager adjusts the slice assignment. When one controller lags behind another, there may be more than one publisher for the same publication_id, causing both controllers to think they are responsible for the same slice. A subscriber controller in the network system might then receive conflicting inputs from the different publisher controllers and must be able to choose between the conflicting inputs. The publication fixed points of some embodiments arrive at the subscriber controller with a version number, and the subscriber controller uses the version number to distinguish between old and new slice assignments, choosing the publisher controller with the more recent version number.

Figure 7:
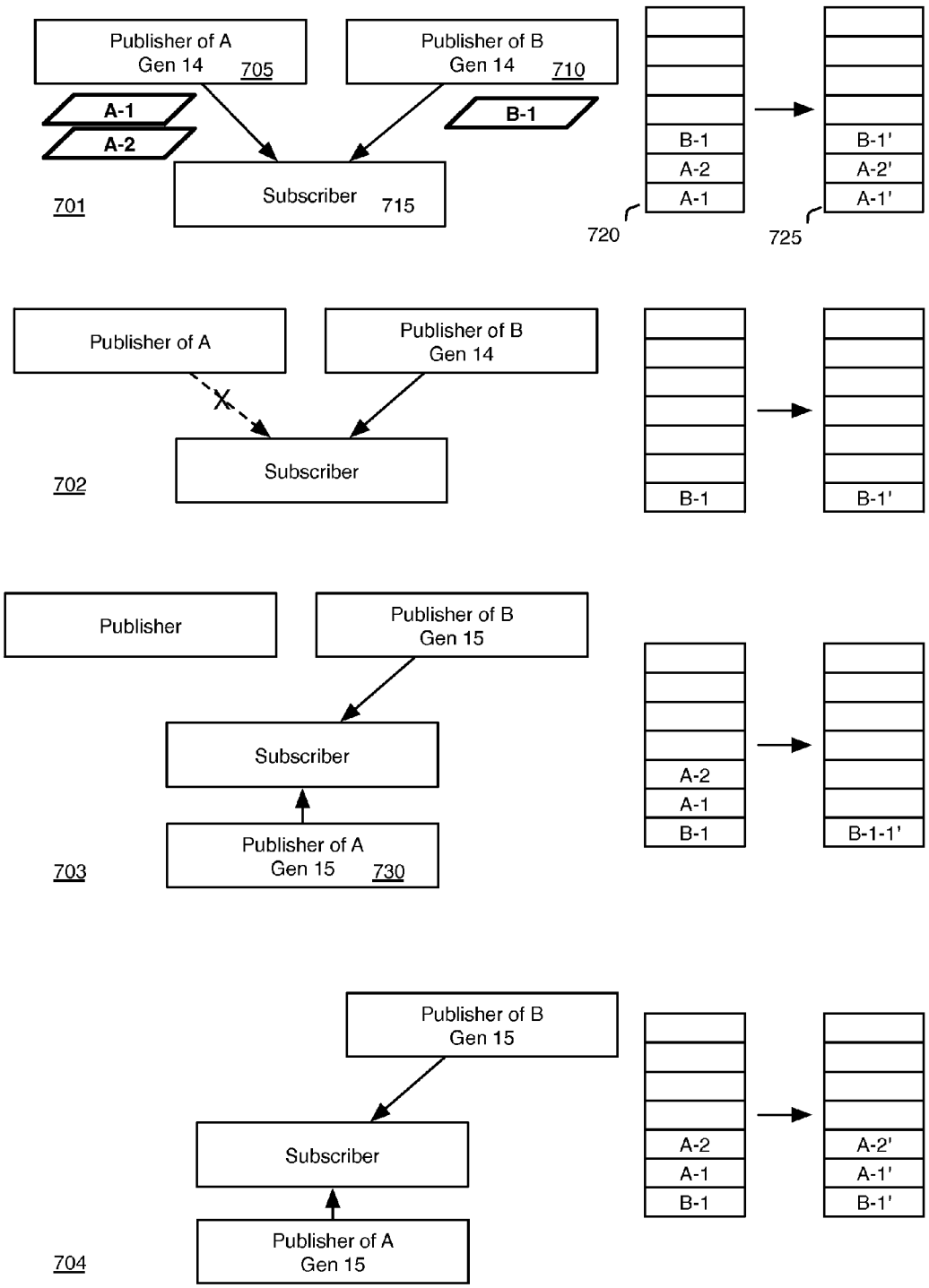
FIG. 7 illustrates an example of moving state for a slice between different controllers.

FIG. 7 illustrates an example of moving state for a slice between different controllers. The first stage 701, shows, on the left side of the figure, publishers 705 and 710, and subscriber 715. The right side of the figure shows input queue 720 and output queue 725 of the subscriber 715. In the first stage 701, publisher 705 publishes tuples A-1 and A-2 for slice A, while publisher 710 publishes tuple B-1 for slice B to subscriber 715. The tuples A-1, A-2, and B-1 in input queue 720 cause the nLog engine to generate tuples A-1', A-2', and B-1' respectively in output queue 725. The publishers 705 and 710 are both publishing generation 14 of the network state. The generation number changes when the slice allocation between the different publishers changes (e.g., when a slice is reassigned).

In the second stage 702, publisher 705 has disconnected, or otherwise become unavailable, from subscriber 715. This may occur when a server fails (e.g., loses connection, crashes, etc.) or when responsibilities for controllers in the controller cluster are redistributed or reassigned. The input tuples A-1 and A-2 for slice A in the input queue 720 have been removed or deleted, causing the output tuples A-1' and A-2' for slice A to be deleted as well after a specified period of time.

In some embodiments, after a disconnect, the input tuples A-1 and A-2 are stored as orphans in a buffered subscriber table, described in further detail below. The buffered subscriber table allows controllers to continue to generate the output tuples A-1' and A-2' for slice A based on the orphaned input tuples A-1 and A-2 in the buffered subscriber table until a new publisher becomes available.

In the third stage 703, publisher 730 has resumed publishing slice A to subscriber 715. In this example, publisher 730 is a new publisher that takes over for publisher 705. Because the slice allocation has changed (i.e., slice A is now published by publisher 730 rather than publisher 705), the generation number has been incremented accordingly from 14 to 15 in both of the current publishers of slices A and B. If publisher 705 had resumed publishing slice A, then the generation number would not have to be incremented. The input tuples A-1 and A-2 for slice A from the new publisher 730 have been re-published to the input queue 720. Finally, in the fourth stage 704, subscriber 720 has recalculated all of the published state by regenerating the output tuples A-1' and A-2' for output queue 725, restoring the state to what it was in stage 701.

In some cases, rather than losing a connection to a publisher controller, a subscriber controller can temporarily receive publications from multiple publisher controllers. When a subscriber controller receives conflicting inputs from different publisher controllers, the subscriber controller will select one publisher controller for each slice, and ignore the same slice from any other publisher controllers. For each slice, the subscriber controller of some embodiments will attempt to select the publisher controller that has the most recent publication version number. The publication's version number includes the slice name, a generation number, and a counter.

Figure 8:
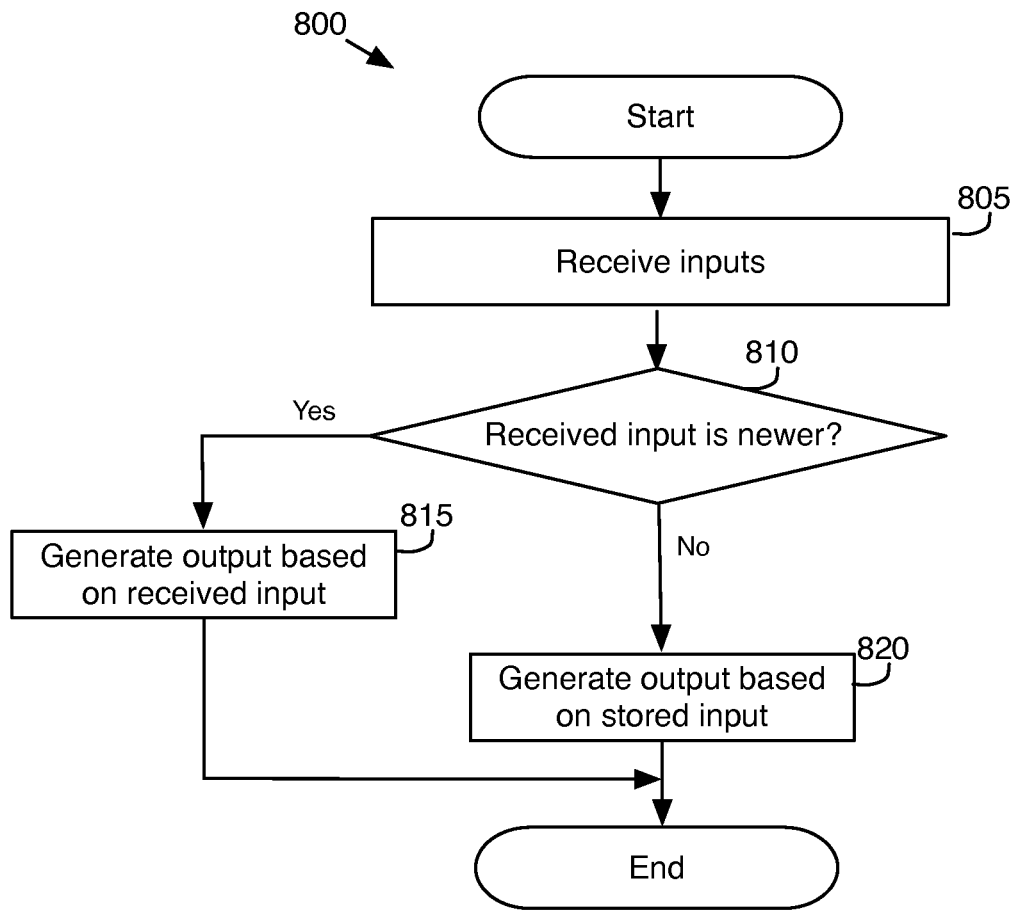
FIG. 8 conceptually illustrates a process for processing conflicting tuples from multiple publishers.

FIG. 8 conceptually illustrates a process 800 for processing conflicting tuples from multiple publishers. The process 800 receives (at 805) a set of input (i.e., data tuples). The set of inputs may be received from various different sources as described above. In some embodiments, the received input is stored in a separate set of tables for each publisher.

The process 800 then determines (at 810) whether the received input is a newer version than input that was received from another controller. The network controller of some embodiments determines that a tuple is newer by comparing generation numbers of the tuples. When the process 800 determines (at 810) that the received input is newer, the process 800 generates (at 815) outputs based on the received inputs. When the process 800 determines (at 810) that the received input is not newer, the process 800 generates (at 815) outputs based on inputs that were previously stored for another controller. The process then ends. Examples of the process 800 will be described below.

Figure 9A:
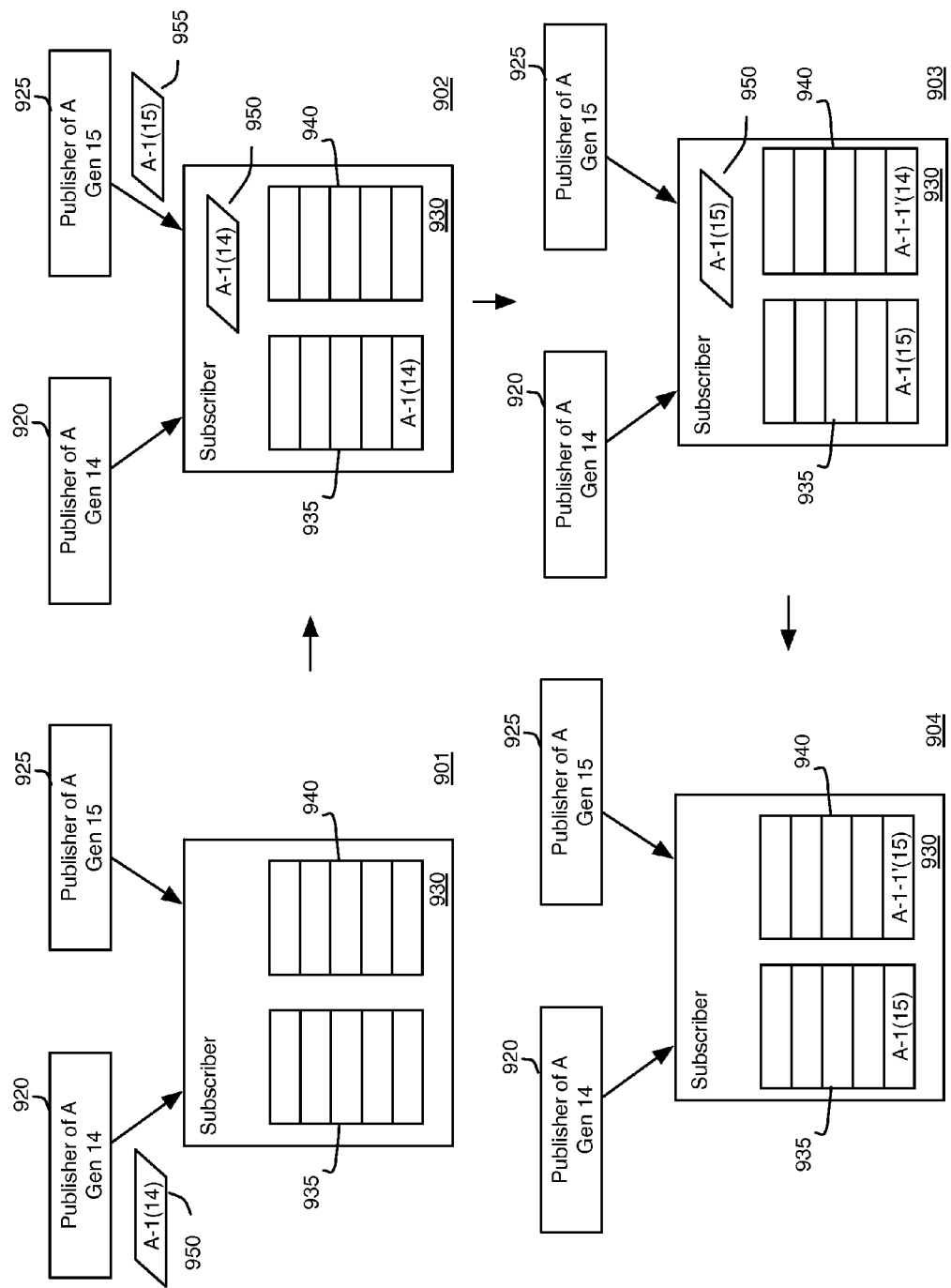
FIGS. 9A-B illustrate different scenarios when using generation numbers to resolve input conflicts from multiple publisher controllers.

FIG. 9A illustrates a first scenario in four stages 901-904, when using generation numbers to resolve input conflicts from multiple publisher controllers in which an older version of the input is received before a newer version. The first stage 901 shows two publishers 920 and 925 and a subscriber 930. The subscriber has input queue 935 and output queue 940. The first stage 901 also shows that publisher 920 sends input tuple 950 with generation number 14 to subscriber 930.

In the second stage 902, the subscriber 930 receives the input tuple 950 and places tuples in the input queue 935. The second stage 902 also shows that publisher 925 also sends an input tuple 955 to subscriber 930. The second input tuple 955 is an equivalent tuple but has a different value than the value received from publisher 920.

The third stage 903 shows that subscriber 930 has processed the input tuple A-1(14) from publisher 920 to produce output tuple A-1(14)'. In addition, the third stage 903 shows that the subscriber 930 has received the input tuple 955 from publisher 925. Since the subscriber already has a value for A-1, the subscriber evaluates the received tuple 955 to determine whether to accept or reject the tuple. In some embodiments, the subscriber 930 rejects any tuple that matches the data stored in the input queue 935. In this example, the subscriber 930 determines that tuple 950 has a different value. The subscriber then determines that the new tuple 950 has a higher generation number (i.e., 15) and replaces the old tuple with the new one in the input queue 935. Finally, in the fourth stage 904, subscriber 930 has generated a new output tuple in the output queue 940.

Figure 9B:
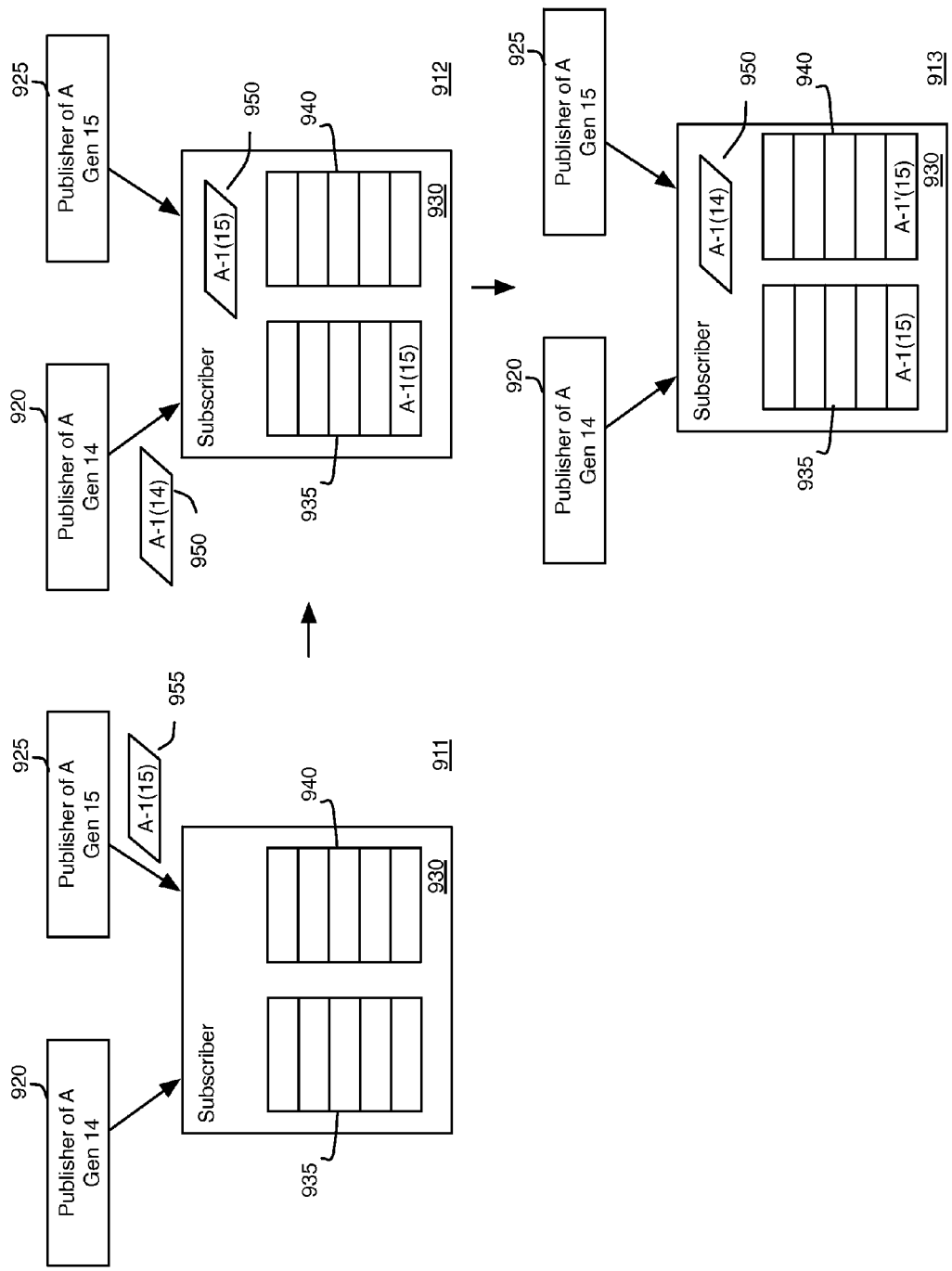

FIG. 9B illustrates a second scenario when using generation numbers to resolve input conflicts in which a newer version of the input is received before an older version in three stages 911-913. Much like the scenario described with reference to FIG. 9A, subscriber 930 receives two conflicting inputs from publishers 920 and 925.

In the first stage 911, publisher 925 sends input tuple 955 with generation number 15 to subscriber 930. In the second stage 912, publisher 920 also sends an input tuple 950 to subscriber 930. The second input tuple 950 is an equivalent tuple but has a different version than the value received from publisher 920. Unlike the first scenario in FIG. 9A, in the second scenario of FIG. 9B, the input tuple 955 reflecting the newer version of the state published from publisher 925 is received first.

The third stage 913 shows that subscriber 930 has processed the input tuple A-1(15) from publisher 925 to produce output tuple A-1(15)'. In addition, the third stage 913 shows that the subscriber 930 has received the input tuple 950 from publisher 920. However, since the subscriber 930 already has a newer version of the tuple 950, the subscriber simply ignores tuple 950 from publisher 920, keeping the outputs generated based on the new generation tuple 955.

A subscriber controller will usually use generation numbers to select between different inputs. However, the network control system of some embodiments implements an active-active backup configuration in which both a master and an active backup controller publish data to the subscriber with the same generation number. In this configuration, both the master controller and the active backup controller should have identical state and the network controller would simply select inputs from one of the master publishers for each slice.

2. Identify Barriers

After inputs have been received, the network controller of some embodiments will identify barriers in the input. In some cases, identifying the barrier is simply a matter of receiving a barrier from an input source that generates barriers. For example, the config stack makes changes to nLog when an update arrives from OVSDB. The config stack has a notion of a single update and will insert a barrier after each update is complete. The initial sync is considered a single update and will work correctly with this scheme. The subscriber table will pass barriers through from the publisher to the nLog instance.

When the input source does not provide barriers, a new component called the BarrierManager will insert the barriers for API changes and CDB import. The BarrierManager will keep track of when new tuples and barriers arrive in the nLog input queue. The BarrierManager will be runnable whenever there are tuples in the input queue without a corresponding barrier. When the BarrierManager runs and there are tuples without a corresponding barrier, the BarrierManager will insert a barrier.

For example, the controller of some embodiments will use a single mechanism to add barriers for both API changes and CDB imports. Both API changes and CDB changes for a consistent unit of work arrive at input tables as callbacks to a centralized data storage (e.g., a Network Information Base (NIB)) grouped within a single scheduler context. This behavior is the same for API changes whether they arrive directly from the API handling code, or via a CDB import. Therefore, the controller can group a set of API changes or CDB changes into a fixed point by pushing a barrier into nLog's input queue when the API code or CDB import yields.

3. Process Fixed Points

By processing the inputs with fixed points, the network control system of some embodiments ensures that changes that could cause inconsistencies in the network state are processed and propagated together. The fixed point ensures that partial changes are not propagated to the dataplane so that the network control system maintains a consistent view of the network state. Although the controllers step through each fixed point, this does not guarantee that all of the controllers arrive at the same fixed point at the same time. In most cases, the controllers will be able to consume and apply fixed points quickly enough that no two controllers should deviate from each other for very long. However, in some embodiments, the network control system enforces lock step updates to ensure that all controllers arrive at the same fixed point at the same time.

In some network control systems, the network controller cluster computes all pending state changes in an arbitrary order such that related changes may not be processed together, resulting in inconsistent state for a period of time. For example, if the cluster is in the middle of computing a large amount of work (e.g., during slice rebalancing), and a logical network configuration change arrives that requires the replacement of a single flow in the dataplane, the cluster might delete that flow right away, and create the replacement flow much later, after the rebalancing work completes. The dataplane connectivity for that one flow would be down for the entire time while the flow is missing from the dataplane (possibly tens of minutes).

As another example, when a dataplane is already wired and working correctly, and the cluster restores from a snapshot, the cluster computes all the OVS state in an arbitrary order. If the cluster output tables were allowed to apply those changes to the dataplane as they are computed, the dataplane would suffer downtime during the entire nLog computation time because the state is incomplete until nLog finishes its computation. This does not happen in practice because the external output tables treat a snapshot restore as a special case and do not send changes to the dataplane while the cluster is working. However, it is undesirable to have such special case handling. Fine grained dataplane fixed points of some embodiments limit periods of downtime due to dataplane inconsistency with a single mechanism and eliminate the need for special case handling in external-output-table and other modules.

Processing fixed points in some embodiments also allows for more efficient state deletion. The network controller cluster of some network control systems creates inconsistent state by deleting state in an inconsistent manner. The network controllers delete state in two different ways (garbage collection or explicit deletion), depending on whether a controller ever computed the need for the state.

First, when a controller sees state that the controller has not computed the need for, the controller will treat that state as garbage and delete that data lazily (but only when the cluster is idle). Treating network state as garbage and deleting it lazily can also prolong dataplane incorrectness. For example, if the physical forwarding elements (PFEs) have a flow that is directing packets incorrectly and the controller did not compute the need for that flow (e.g., when the flow was not deleted or manually added), then the controller will treat that flow as garbage and not delete it for a certain period of time (e.g., at least 60 seconds). The garbage collection lag can be even longer while the cluster performs state computations. The network controllers delay garbage collection while processing the network state because the output is likely to be inconsistent until the processing is completed. The network controllers can be working for long periods of time before reaching a consistent state, prolonging the garbage collection time lag.

Second, if the controller has computed the need for state in the past, but now decides to explicitly delete that state, the controller will delete that state from the forwarding elements immediately. In some network control systems, this distinction between garbage collection and explicit deletion is not applied consistently in the runtime, and leads to complexity and undesirable behavior. For example, when a publisher disconnects from a subscriber, the subscriber cleans up the subscription tuples received from the publisher after a brief time delay. The controller treats the cleaned up subscription tuples as explicit deletions and immediately deletes the state from the input tables even though the removal of the subscription tuples was not the result of a configuration change to explicitly delete the subscription tuples. Such deletions cause dataplane downtime whenever a subscriber loses a publisher for longer than a preset time delay. For example, when a logical standby controller is promoted to master before nLog finishes computing the standby network state (like in the example of FIG. 5), the subscribers of the promoted standby controller may delete the received outputs from the previous master controller before the promoted standby controller can resume publishing new outputs. Such problems can be fixed with buffered subscriber tables as described below.

In another example, similar to the subscriber table issue, the network controllers incorrectly delete state when a chassis controller is reconnected after a disconnection. When a chassis controller initially connects to a network controller cluster, the controllers of the network controller cluster read virtual network interface (VIF) locations from the chassis controller. It takes some time to send all the VIF locations to the network controller cluster. When the chassis controller connects for the first time and all the VIF information is new, the controller can begin processing those VIF locations as they arrive. However, if the chassis controller was connected in the past, disconnects, and then reconnects, the network controllers may attempt to calculate the state with an incomplete list of VIFs, implying that the other VIFs no longer exist. This would erroneously cause flow deletions at the physical forwarding elements. One way to solve this problem is to treat the sync as a single fixed point. If none of the VIFs actually change, the fixed point will be a no-op. The controllers of the controller cluster of some embodiments must treat the second connection synchronization as a single fixed point. One way to solve this problem is to treat the sync as a single fixed point. If none of the VIFs actually change, the fixed point will be a no-op.

In addition to adding the barrier support to the nLog runtime, the system of some embodiments constructs appropriate fixed points. Determining whether a fixed point is appropriate requires extra care because nLog requires inputs to be present in order to compute outputs, and the data sources for a controller can become unavailable or disconnected. In this discussion, a source is a publisher (i.e., a chassis or controller).

When processing using fixed points, it is desirable to minimize delays that affect the completion of network state computation because a fixed point will delay further processing until all of the tuples of the fixed point have completed processing. In particular, certain delays may arise when processing for a controller is forced to wait for responses from external processes (e.g., a request for context from a context allocator) to generate output. For example, some internal-only events use a context allocator. The event requests a context from the context allocator and waits for a response. The response from the context allocator needs to be received back from the context allocator before the flow computation can continue. These intermediate tables must feed output tuples to the outside world right away to avoid delaying the nLog processing.

Figure 10:
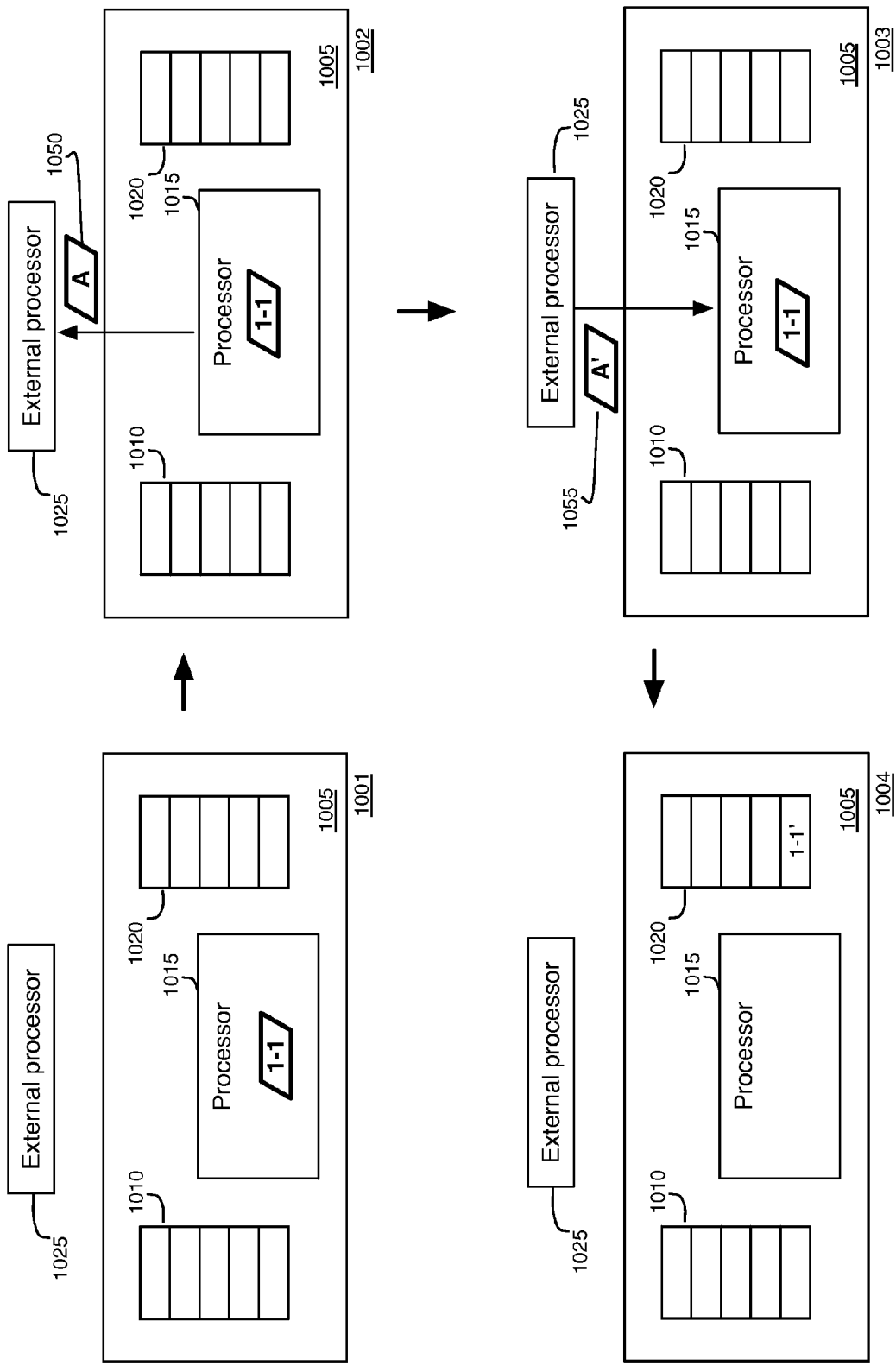
FIG. 10 illustrates an example of processing inputs with an external processor.

FIG. 10 illustrates an example of processing inputs with an external processor in four stages 1001-1004. Like the example of FIG. 5, the first stage 1001 shows a controller 1005, which includes an input queue 1010, a processor 1015, and an output queue 1020. FIG. 10 also illustrates that controller 1005 includes a secondary processor 1025 for processing requests outside of nLog. In the first stage 1001, the processor 1015 is ready to process tuple 1-1.

In the second stage 1002, the processor 1015 sends an external request 1050 to the external processor 1025. In this example, tuple 1-1 requires processing from an external processor 1025. The external processor 1025 could serve several different functions in processing the input tuple 1-1. For example, a context allocator takes an input and produces a context (i.e., two random numbers) based on the input.

The network control system must ensure that tables finish their requests quickly because otherwise, they will block the completion of the fixed point. For example, compression tables or a context allocator are able to finish requests quickly, but a hysteresis table is not. Hysteresis tables violate the notion of fixed point because the hysteresis delay will cause an inconsistency between the input tuples and the output tuples. Some hysteresis tables exist to squash compression table churn; fixed point makes these tables unnecessary.

In order to ensure that any external processing completes as quickly as possible, the secondary processor 1025 of some embodiments will ignore any barriers. The secondary processor 1025 does not use the barriers because the processor cannot finish processing the input tuples (e.g., tuples 1-2, 1-3, and 1-4) until the results are received from the secondary processor for tuple 1-1.

In addition to having to wait, the controller 1005 has to be sure that a fixed point is not reached while still waiting for a response from an external processor. An output-table that reinserts tuples into nLog is called a drainable-output-table; this includes tables like compress-output-table, and the context-allocation-table. Drainable-output-tables implement a wait( ) method that blocks until the output table is finished inserting tuples into nLog given any outstanding output tuples. During the course of reaching a fixed point, the controller will invoke the wait( ) function on drainable output tables. The wait( ) method blocks until the output table is finished applying its outstanding changes back into the nLog input queue; outstanding changes could mean inserting tuples back into nLog.

In the third stage 1003, the external processor 1025 sends a response A' back to the intermediate tables to complete the processing of input tuple 1-1. Finally, the fourth stage 1004 shows that the received output A' is used to generate output 1-1'.

As described above, the use of secondary processors is not preferred. It is desirable to avoid using the external processors when possible. In some embodiments, data is moved into nLog to avoid the external access required in order to reduce computation times in the network control system. For example, in some embodiments, output tables that use mastership information will change to use mastership from nLog, rather than the NIB. The mastership information must come from nLog so that the output tables and mastership can be consistent with one another at each fixed point. If the output table reads mastership information from the NIB, the nLog tables can be inconsistent with the nLog output tuples because nLog can lag behind the NIB. To implement this, the slice table will be an output table that outputs to an in memory table that is accessible by other output tables. This new slice-output table must be flushed first before all other output tables to ensure that all other tables have up to date slice information. In the chassis architecture of some embodiments, the chassis output tables can ignore mastership because the chassis controller will always be master of the local OVS instance, and the local NIB instance.

In addition to reducing computation times, it is also beneficial to move other functions into nLog because fixed point design does not guarantee that external information (e.g., configuration information) is up to date. For example, publisher A might be up to date with CDB, and publisher B is behind. If a slice moves from A to B, then even though the slice is moving to a newer controller, that controller might publish an outdated value to the subscriber. In some embodiments, information stored in the CDB is moved into nLog. By moving the external information into nLog, the system can ensure that the state remains consistent when moving between slices.

The controllers of some embodiments change the nLog control flow to compute as much of these as possible so that nLog need not wait for responses from OVS. Otherwise, nLog may reach a fixed point based on its input tuples, but the dataplane will not be consistent with the input tuples because nLog is still waiting for outstanding requests to insert more input tuples.

Some embodiments of the network control system remove dependencies on OVS because the nLog output will not be complete if nLog still needs to wait for OVS to send inputs. As described above, hysteresis tables can cause delays that lead to inconsistencies in the network state. Some hysteresis tables exist to squash compression table churn. As fixed points make these tables unnecessary, these tables can be removed. For other hysteresis tables, some embodiments of the network control system move the hysteresis function outside of nLog.

4. Output Barriers

An output table will behave differently depending on whether it produces externally visible side effects. As described above, if the effects are only internal (i.e., produce outputs to intermediate tables), barriers may be ignored. However, when the effects are external, the network controller of some embodiments will identify and output barriers.

For example, data in the output tables of the chassis controllers will have external side effects (i.e., flows that affect the dataplane), so the output tables must buffer output tuples from the flusher until the flusher invokes a barrier( )method. Then the output tables can push all the flow modifications as a group to the physical forwarding elements.

Once the fixed points have been processed, the network controller of some embodiments will output barriers for the output tuples to ensure that the output tuples also use fixed points. For example, a logical controller reads all its inputs from CDB, so the logical controller can send a barrier right after the barriers arrive from CDB. In some cases, this will group more than one user visible API change into a single fixed point because CDB can import more than one transaction at once before yielding, but grouping multiple fixed points into a single one does not affect correctness. A chassis controller reads all its inputs from a single physical controller, so the chassis controller can send a barrier to the PFE output tables right after the barrier arrives from the physical master controller.

As nLog computes output tuples, a flusher flushes those tuples to output tables. When the nLog evaluation loop reaches a fixed point, it invokes the barrier( ) method on all output tables to insert barriers for the outputs. The controller should not start computing for a fixed point unless a corresponding barrier exists in the input queue. After the fixed point is reached, the controller invokes the barrier( ) method on each output table. The barrier( ) method tells the output table that a consistent fixed point has been reached, and the output table can then act appropriately. For some tables like publication tables, that means forwarding the tuples along with the barrier to the subscriber. For other tables like PFE output tables, that means sending all outstanding updates to the PFEs at once, and deleting all of the undesired flows from the PFEs.

In addition to producing inconsistent state, such a calculation of state when the standby controller takes over for a master controller results in unnecessary churn in the network control system. Rather than propagating all of the network changes in a consistent manner, some network control systems send network state changes as they are generated. In some cases, where new changes may cancel out previous changes, unnecessary changes are sent into the dataplane, resulting in churn.

Finally, there are a couple remaining places where the wiring code uses compression tables or compression-like behavior. Grouping changes from a snapshot restore into a single fixed point after a restart or restore will eliminate churn caused by those compression tables because all intermediate compression table state will cancel out within the fixed point.

While in some embodiments, the network controller flushes the outputs whenever a barrier is detected at the output queue, it may be necessary in certain situations to ignore the barriers and keep the outputs in the output queue until further processing is complete. For example, when a standby (or backup) network controller is promoted while the state computation on the standby controller is in progress, no master controller is available until the computation is complete. The new master controller incrementally computes network state and may encounter multiple barriers in calculating the state. However, immediately propagating these fixed points would cause the intermediate flow state to be inconsistent with itself until the standby computations are completed, resulting in an inconsistent state of the network. The controllers of some embodiments will create a single fixed point for all of the standby computations, ensuring that the changes are all propagated together.

As another example, when a controller in the network starts up, the network control system may need to take additional steps to ensure that changes are not propagated to the dataplane before it is ready. During startup, if a controller needs to receive input data from multiple sources to compute its output, then that controller must wait until a fixed point has arrived from all inputs before the controller sends its first barrier. In practice, this affects physical controllers because a physical controller gets input from all logical slices. If a physical controller did not wait for all logical slices, the physical controller would send a barrier with an incomplete set of inputs, causing dataplane inconsistency and downtime. Since the controller runs both the logical and physical controllers in the same nLog runtime, the OVS output tables ignore barrier( ) function calls until a special startup-complete barrier arrives.

Also, at startup, the controller must ignore any barrier messages that arrive before CDB is finished with importing inputs, or before bootstrap complete is invoked.

III. Buffered Subscribers

In conjunction with providing fixed point support, the network control system of some embodiments provides buffered subscribers. Each controller will use a BufferedSubscriber table to preserve input data while a publisher is unavailable to prevent nLog from deleting the inputs and thus deleting the outputs. A BufferedSubscriber of some embodiments takes the place of each Subscriber table. When a publisher becomes available again and sends updated inputs followed by a barrier, then the BufferedSubscriber constructs a single fixed point containing the newly published values and removals for the previously publication values (the "buffered" values). Using a single fixed point in some embodiments avoids sending partial changes down to OVS.

As seen in the example of FIG. 5, however, it is undesirable to lose the output state while the subscriber recalculates the output state. Therefore, in some embodiments, the network control system provides buffered subscribers that are able to buffer the inputs in the case of failure. Rather than deleting all of the output state, the buffered subscriber maintains the state until an explicit change to the state is received at the subscriber.

The BufferedSubscriber expects each publisher to send publications to the BufferedSubscriber. After first connecting to a BufferedSubscriber, the publisher must send the entire state of all of its publications, but subsequent updates should contain only differences. Each set of updates from different fixed points should be separated by a barrier message. In some embodiments, each publisher must include in its publications three metadata tables: (1) the list of slices that the publisher is responsible for, (2) a generation number associated with that slice assignment, and (3) the list of publication_IDs that the publisher is responsible for. The slice-manager increments the generation number each time it changes the slice assignments, and stores the generation number with the control node. The list of publication_IDs must also include a slice number for each publication_id. These three metadata tables should be consistent with the rest of the publications in each fixed point.

The BufferedSubscriber of some embodiments maintains a local copy of each publisher's metadata publications (generation number, slice table, and mapping table). The BufferedSubscriber also stores a copy of each publisher's publications so that publishers can just send differences from the stored copy whenever a publisher sends an update.

BufferedSubscribers on physical controllers receive publications from chassis controllers. Each chassis controller has just one slice that is unique to that chassis controller. Each chassis controller also has just one publication_ID that is unique to that chassis controller. If a chassis controller disconnects, the physical controller will retain the chassis' publication as an orphan until the chassis controller reconnects. The controller cluster saves chassis publication data persistently if it is useful for wiring, this includes things like VIF locations. This ensures that the cluster can compute the flows without needing to talk to the chassis controller.

Figure 11:
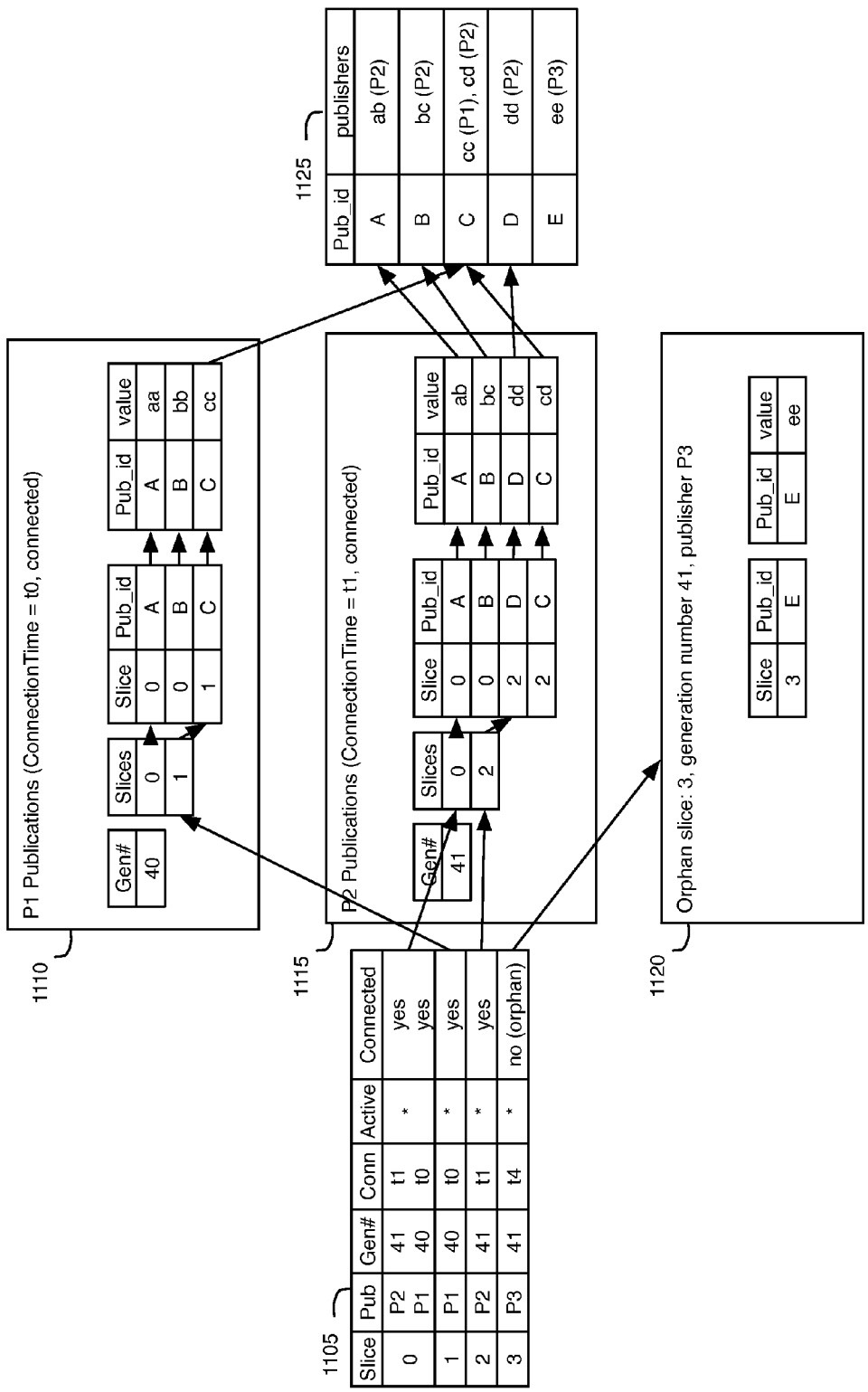
FIG. 11 illustrates an example of an implementation of a BufferedSubscriber.

FIG. 11 illustrates an example of an implementation of a BufferedSubscriber. In particular, this figure shows a set of five tables: a selection table 1105, publications tables 1110 and 1115 for publishers P1 and P2, an orphan slice table 1120, and a conflict resolution table 1125.

The BufferedSubscriber of some embodiments computes a Selection table 1105 using the publishers' metadata tables each time it receives an update from one of the publishers. The Selection table 1105 determines which publisher provides the publications for each slice. The Selection table 1105 contains a slice-entry for each slice. Within each slice-entry, there is a row for each (publisher, connection_time) pair. The rows in each slice-entry are sorted by generation number (larger generation numbers on top), and ties are broken with the publisher_id. The top-most entry is the active entry, meaning that the BufferedSubscriber pushes the active publication values towards nLog. If after an update, the active entry's publisher no longer publishes that slice, the slice will become an orphan slice. This means that the BufferedSubscriber will preserve the orphan slice's publications and stop applying changes to that slice. If a publisher eventually publishes a newer version of the orphan slice, the BufferedSubscriber of some embodiments will delete the orphan slice, and make the new publication active.

The BufferedSubscriber of some embodiments maintains a Session object for each connected publisher. The Session object contains a Slice table that mirrors the publication listing the slices that publisher claims to provide. Each entry in the Slice table of some embodiments points to a set of mappings from that slice to publication_ids in the Mapping table if the mapping exists. The Mapping table maps from slice to publication_id, mirroring the publication that the publisher sends. Each entry points to the publication with the matching publication_id if the publication exists.

The Publication tables 1110 and 1115 contain an entry for each publication sent by each publisher. A publication is active when there is an uninterrupted sequence of pointers from the Selection table 1105 to the publication. If the publication is active, the publication contains a pointer to the Conflict Resolution table 1125.

The Conflict Resolution table 1125 sits between the publication tables 1110 and 1115 and nLog itself. In some embodiments, bugs in nLog rules or in the nLog fixed point implementation may cause publication C to belong to different slices, where both of the slices are active. Such a bug will create a conflict, in which two separate publications for C exist at the same time. The Conflict Resolution table 1125 resolves the conflict and selects one of the publications. If the winning publication stops being active, the Conflict Resolution table 1125 of some embodiments will remove it from nLog, and send the runner-up to nLog, assuming the runner-up is also active. If there is no runner-up (like when there is no conflict), the Conflict Resolution table 1125 will just remove the publication from nLog. In some embodiments, such conflicts do not arise and the Conflict Resolution table is simply used to provide the published and orphaned publications to nLog.

The following section describes the performance of certain functions with the implementation of the BufferedSubscriber described with reference to FIG. 11. After a barrier arrives at the BufferedSubscriber, the controller copies the selection table and applies metadata changes to get a new selection table. The controller then determines changes (e.g., adds, deletes, new orphans, etc.) between the old and new selection tables. The controller deep copies newly orphaned slices and modifies the selection table to use new orphans. For each slice that is newly active, the controller adds tuples for the slice to nLog. For each slice that is no longer active, the controller removes the tuples for the inactive slices from nLog. The controller applies slice table remove changes. Applying the slice table remove changes should not affect tuples because the tuples for slices that are no longer active have already been removed. The controller then applies pub-mapping changes (if active, forward changes to nLog) and publication tuple changes (if active, forward changes to nLog). The controller deletes unused orphan slices and processes changes to pub-slice conflicts. If a conflict winner is removed, it is replaced with the next conflict winner and inserted to nLog. Finally, the controller sends a barrier to the nLog input queue.

When a publisher disconnects from a BufferedSubscriber, the controller converts all active slices to orphans, and updates the selection table with a new location. The controller then deletes all of the non-active slices. When a controller receives a new connection to a publisher, the controller creates a new Session data structure for the publisher. Creating the new Session data structure should not affect nLog.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
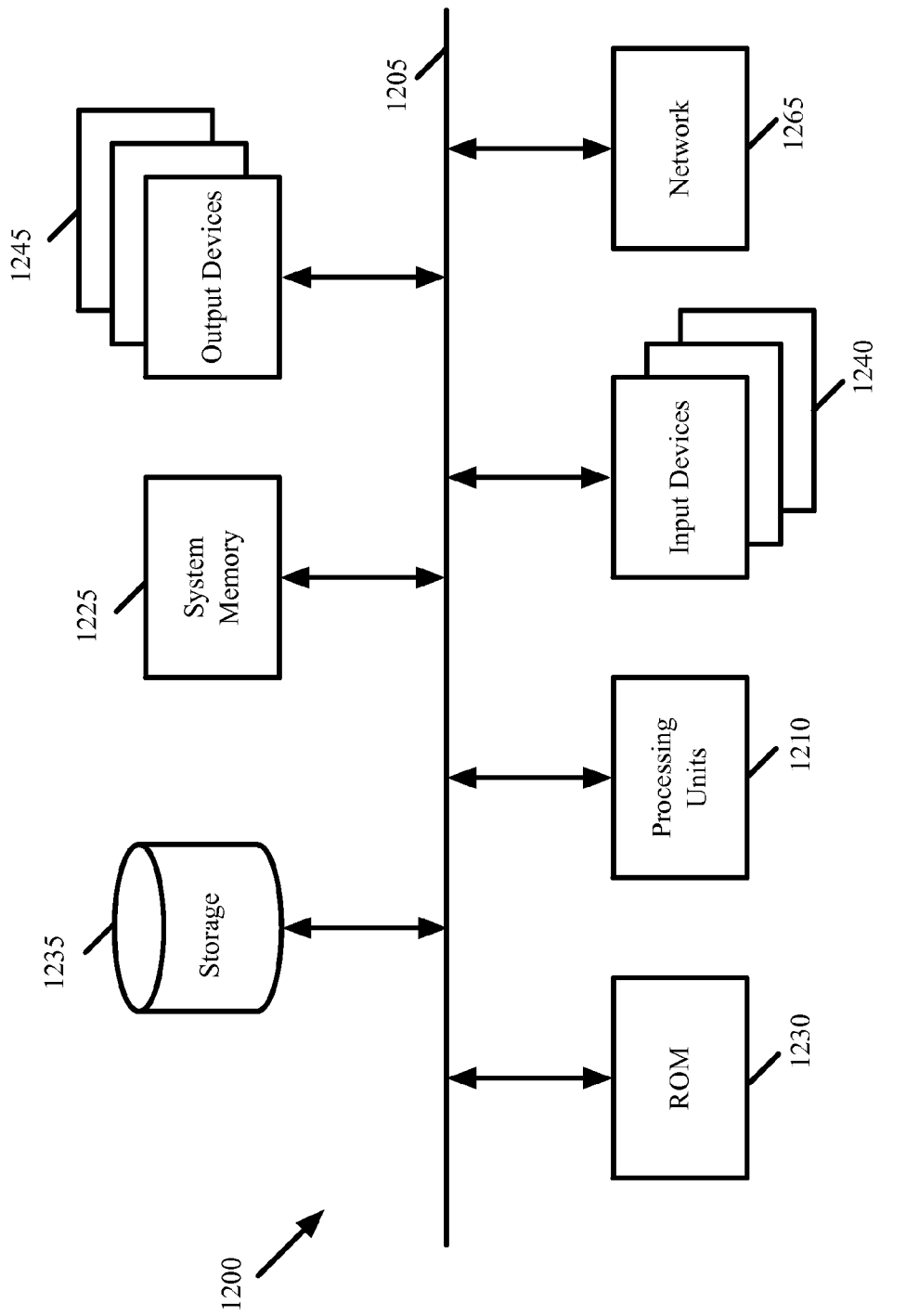
FIG. 12 conceptually illustrates an electronic system with which some embodiments of the invention are implemented.

FIG. 12 conceptually illustrates an electronic system 1200 with which some embodiments of the invention are implemented. The electronic system 1200 can be used to execute any of the control, virtualization, or operating system applications described above. The electronic system 1200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1200 includes a bus 1205, processing unit(s) 1210, a system memory 1225, a read-only memory 1230, a permanent storage device 1235, input devices 1240, and output devices 1212.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieve instructions to execute and data to process in order to execute the processes of the invention. The processing unit(s) may be a single processor or a multi-core processor in different embodiments.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory is a volatile read-and-write memory, such a random access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1212. The input devices enable the user to communicate information and select commands to the electronic system. The input devices 1240 include alphanumeric keyboards and pointing devices (also called "cursor control devices"). The output devices 1245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 4, and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Also, several embodiments were described above in which a user provide logical datapath sets in terms of logical control plane data. In other embodiments, however, a user may provide logical datapath sets in terms of logical forwarding plane data. In addition, several embodiments were described above in which a controller instance provide physical control plane data to a switching element in order to manage the switching element. In other embodiments, however, the controller instance may provide the switching elements with physical forwarding plane data.

Furthermore, in several examples above, a user specifies one or more logic switches. In some embodiments, the user can provide physical switch configurations along with such logic switch configurations. Also, even though controller instances are described that in some embodiments are individually formed by several application layers that execute on one computing device, one of ordinary skill will realize that such instances are formed by dedicated computing devices or other machines in some embodiments that perform one or more layers of their operations. Thus, one of ordinary skill in the art would understand that the invention is not to be limited by the foregoing illustrative details. Thus, one of ordinary skill in the art would understand that the invention is not to be limited by the foregoing illustrative details.

What is claimed is:

1. A host computer for executing a network controller for computing forwarding rules in a distributed network control system, the host computer comprising:
   at least one processing unit for executing instructions;
   a non-transitory machine readable medium storing sets of instructions for implementing the network controller, the sets of instructions for:
      defining a primary input queue and a plurality of secondary input queues for storing inputs received at the network controller;
      storing inputs regarding configurations of logical forwarding elements implemented by a plurality of physical forwarding elements, said stored inputs received from a plurality of input sources in the plurality of secondary input queues, each secondary input queue for storing inputs from one of the plurality of input sources;
      inserting barriers between the stored inputs in each secondary input queue of the plurality of secondary input queues, each of the barriers indicating an end to a set of the inputs to be processed together, the barriers for preventing partial changes to the forwarding rules propagating to the physical forwarding elements;

detecting the barriers on the secondary input queues and moving each of the sets of inputs as a group to the primary input queue; and sending a set of forwarding rules to a set of the physical forwarding elements in the distributed network control system, the forwarding rules computed by processing together each set of inputs in the primary input queue.

2. The host computer of claim 1, wherein the set of instructions for inserting the barriers comprises a set of instructions for inserting a barrier on a particular secondary input queue after detecting that the corresponding input source for the particular secondary input queue has reached a fixed point that indicates that processing of the received inputs will result in a consistent view of a network state.

3. The host computer of claim 2, wherein the set of instructions for detecting that the corresponding input source for the particular secondary input queue has reached a fixed point comprises a set of instructions for determining that the particular secondary input queue has not received any inputs from the input source for a threshold period of time.

4. The host computer of claim 1, wherein the non-transitory machine readable medium further stores a set of instructions for receiving the barriers from the input sources.

5. The host computer of claim 1, wherein the plurality of input sources comprises at least one of a publisher controller and a configuration database.

6. The host computer of claim 1, wherein the set of forwarding rules is computed by a table mapping rule engine.

7. The host computer of claim 1, wherein the set of forwarding rules defines a set of states for the distributed network control system.

8. For a network controller that computes forwarding rules in a distributed network control system, a method comprising:

storing inputs regarding configurations of logical forwarding elements implemented by a plurality of physical forwarding elements, said stored inputs received from a plurality of input sources in a plurality of secondary input queues, each secondary input queue for storing inputs from a one of a plurality of input sources in the network;

inserting barriers between the stored inputs in each secondary input queue of the plurality of secondary input queues, each of the barriers indicating an end to a set of the inputs to be processed together, the barriers for preventing partial changes to the forwarding rules propagating to the physical forwarding elements;

detecting the barriers on the secondary input queues and moving each of the sets of the inputs as a group to a primary input queue; and sending a set of forwarding rules to a set of the physical forwarding elements in the distributed network control system, the forwarding rules computed by processing together each set of inputs in the primary input queue.

9. The method of claim 8, wherein inserting the barriers comprises inserting a barrier on a particular secondary input queue after detecting that the corresponding input source for the particular secondary input queue has reached a fixed point that indicates that processing of the received inputs will result in a consistent view of a network state.

10. The method of claim 9, wherein detecting that the corresponding input source for the particular secondary input queue has reached a fixed point comprises determining that the particular secondary input queue has not received any inputs from the input source for a threshold period of time.

11. The method of claim 8, wherein receiving the barriers comprises receiving barriers from the input sources.

12. The method of claim 8, wherein the plurality of input sources comprises at least one of a publisher controller and a configuration database.

13. The method of claim 8, wherein the set of forwarding rules is computed by a table mapping rule engine.

14. The method of claim 8, wherein the set of forwarding rules defines a set of states for a set of physical forwarding elements in the distributed network control system.

15. A non-transitory machine readable medium storing sets of instructions for implementing a network controller for computing forwarding rules in a distributed network control system, the sets of instructions executable by a processing unit, the sets of instructions for:

storing inputs regarding configurations of logical forwarding elements implemented by a plurality of physical forwarding elements, said stored inputs received from a plurality of input sources in a plurality of secondary input queues, each secondary input queue for storing inputs from one of the plurality of input sources;

inserting barriers between the stored inputs in each secondary input queue of the plurality of secondary input queues, each of the barriers indicating an end to a set of inputs to be processed together, the barriers for preventing partial changes to the forwarding rules propagating to the physical forwarding elements;

detecting the barriers on the secondary input queues and moving each of the sets of inputs as a group to a primary input queue; and sending a set of forwarding rules to a set of the physical forwarding elements in the distributed network control system, the forwarding rules computed by processing together each set of inputs in the primary input queue.

16. The non-transitory machine readable medium of claim 15, wherein the set of instructions for inserting the barriers comprises a set of instructions for inserting a barrier on a particular secondary input queue after detecting that the corresponding input source for the particular secondary input queue has reached a fixed point that indicates that processing of the received inputs will result in a consistent view of a network state, wherein the set of instructions for detecting that the corresponding input source for the particular secondary input queue has reached a fixed point comprises a set of instructions for determining that the particular secondary input queue has not received any inputs from the corresponding input source for a threshold period of time.

17. The non-transitory machine readable medium of claim 15, wherein the non-transitory machine readable medium further stores a set of instructions for receiving barriers from the input sources.

18. The non-transitory machine readable medium of claim 15, wherein the plurality of input sources comprises at least one of a publisher controller and a configuration database.

19. The non-transitory machine readable medium of claim 15, wherein the set of forwarding rules is computed by a table mapping rule engine.

20. The non-transitory machine readable medium of claim 15, wherein the set of forwarding rules defines a set of states for the distributed network control system.

* * * * *